United States Patent
Moll et al.

(10) Patent No.: US 12,265,663 B2
(45) Date of Patent: Apr. 1, 2025

(54) GESTURE-BASED APPLICATION INVOCATION

(71) Applicant: Snap Inc., Santa Monica, CA (US)

(72) Inventors: Sharon Moll, Lachen (CH); Piotr Gurgul, Hergiswil (CH); Francis Patrick Sullivan, Sandy, UT (US); Andrei Rybin, Lehi, UT (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 17/657,911

(22) Filed: Apr. 4, 2022

(65) Prior Publication Data

US 2023/0315208 A1    Oct. 5, 2023

(51) Int. Cl.
G06F 3/01       (2006.01)
G06F 3/0482     (2013.01)

(52) U.S. Cl.
CPC ............ G06F 3/017 (2013.01); G06F 3/0482 (2013.01)

(58) Field of Classification Search
CPC ............................... G06F 3/017; G06F 3/0482
USPC .................................................. 715/810, 863
See application file for complete search history.

(56) References Cited

U.S. PATENT DOCUMENTS

| | | | |
|---|---|---|---|
| 6,513,009 B1 * | 1/2003 | Comerford | G10L 15/22 704/E15.04 |
| 7,971,156 B2 | 6/2011 | Albertson et al. | |
| 7,996,793 B2 | 8/2011 | Latta et al. | |
| 8,487,938 B2 | 7/2013 | Latta et al. | |
| 8,856,691 B2 | 10/2014 | Geisner et al. | |
| 9,207,852 B1 | 12/2015 | Zhou et al. | |
| 9,225,897 B1 | 12/2015 | Sehn et al. | |
| 9,230,160 B1 | 1/2016 | Kanter | |
| 9,276,886 B1 | 3/2016 | Samaranayake | |
| 9,705,831 B2 | 7/2017 | Spiegel | |
| 9,742,713 B2 | 8/2017 | Spiegel et al. | |
| 10,102,423 B2 | 10/2018 | Shaburov et al. | |
| 10,284,508 B1 | 5/2019 | Allen et al. | |
| 10,423,237 B2 | 9/2019 | Episkopos et al. | |
| 10,439,972 B1 | 10/2019 | Spiegel et al. | |
| 10,509,466 B1 | 12/2019 | Miller et al. | |

(Continued)

FOREIGN PATENT DOCUMENTS

| | | |
|---|---|---|
| CN | 103049761 B | 8/2016 |
| EP | 3707693 A1 | 9/2020 |

(Continued)

OTHER PUBLICATIONS

Ng et al., "Real-time gesture recognition system and application", Image and Vision Computing 20 (2002) pp. 993-1007. (Year: 2002).*

(Continued)

*Primary Examiner* — Hwei-Min Lu
(74) *Attorney, Agent, or Firm* — Schwegman Lundberg & Woessner, P.A.

(57) ABSTRACT

A head-worn device system includes one or more cameras, one or more display devices and one or more processors. The system also includes a memory storing instructions that, when executed by the one or more processors, configure the system to detect a gesture made by a user of the computing apparatus and generate gesture data identifying the gesture, select an application or selected action from a set of registered applications and actions based on the gesture data, and invoke the application or selected action.

15 Claims, 19 Drawing Sheets

(56) References Cited

U.S. PATENT DOCUMENTS

| | | | |
|---|---|---|---|
| 10,514,876 | B2 | 12/2019 | Sehn |
| 10,579,869 | B1 | 3/2020 | Xiong et al. |
| 10,614,855 | B2 | 4/2020 | Huang |
| 10,748,347 | B1 | 8/2020 | Li et al. |
| 10,877,568 | B2 | 12/2020 | Huang et al. |
| 10,958,608 | B1 | 3/2021 | Allen et al. |
| 10,962,809 | B1 | 3/2021 | Castañeda |
| 10,996,846 | B2 | 5/2021 | Robertson et al. |
| 10,997,787 | B2 | 5/2021 | Ge et al. |
| 11,012,390 | B1 | 5/2021 | Al Majid et al. |
| 11,030,454 | B1 | 6/2021 | Xiong et al. |
| 11,036,368 | B1 | 6/2021 | Al Majid et al. |
| 11,062,498 | B1 | 7/2021 | Voss et al. |
| 11,087,728 | B1 | 8/2021 | Canberk et al. |
| 11,092,998 | B1 | 8/2021 | Castañeda et al. |
| 11,106,342 | B1 | 8/2021 | Al Majid et al. |
| 11,126,206 | B2 | 9/2021 | Meisenholder et al. |
| 11,143,867 | B2 | 10/2021 | Rodriguez, II |
| 11,157,725 | B2 | 10/2021 | Andersen et al. |
| 11,169,600 | B1 | 11/2021 | Canberk et al. |
| 11,227,626 | B1 | 1/2022 | Krishnan Gorumkonda et al. |
| 11,307,747 | B2 | 4/2022 | Dancie et al. |
| 11,308,266 | B1 | 4/2022 | Estrada Diaz |
| 11,531,402 | B1 | 12/2022 | Stolzenberg |
| 11,546,505 | B2 | 1/2023 | Canberk |
| 2009/0012788 | A1 | 1/2009 | Gilbert et al. |
| 2010/0050133 | A1 | 2/2010 | Nishihara et al. |
| 2010/0199232 | A1* | 8/2010 | Mistry .................. G06F 3/0426 715/863 |
| 2010/0304813 | A1* | 12/2010 | Finocchio .............. A63F 13/213 463/43 |
| 2011/0258537 | A1 | 10/2011 | Rives et al. |
| 2011/0274311 | A1 | 11/2011 | Lee et al. |
| 2011/0301934 | A1 | 12/2011 | Tardif |
| 2012/0078614 | A1 | 3/2012 | Galor et al. |
| 2012/0113241 | A1* | 5/2012 | Sundaresan ............ G06V 40/28 382/103 |
| 2012/0297400 | A1* | 11/2012 | Hill ......................... G06F 9/445 719/318 |
| 2013/0051614 | A1 | 2/2013 | Lee et al. |
| 2013/0106707 | A1* | 5/2013 | Chen .................. G06F 3/04883 345/173 |
| 2013/0211843 | A1* | 8/2013 | Clarkson ................. G06F 3/017 704/275 |
| 2013/0263042 | A1* | 10/2013 | Buening ............. G06F 3/04883 715/783 |
| 2014/0171036 | A1 | 6/2014 | Simmons |
| 2014/0282270 | A1* | 9/2014 | Slonneger ............... G06F 3/017 715/863 |
| 2014/0282272 | A1* | 9/2014 | Kies ......................... G06F 3/017 715/863 |
| 2015/0012426 | A1 | 1/2015 | Purves et al. |
| 2015/0029092 | A1* | 1/2015 | Holz ......................... G06F 3/017 345/156 |
| 2015/0120293 | A1 | 4/2015 | Wohlert et al. |
| 2015/0370320 | A1 | 12/2015 | Connor |
| 2015/0378158 | A1* | 12/2015 | Lundberg ............... G06V 10/46 382/103 |
| 2015/0381714 | A1* | 12/2015 | Hawkins ............... G06F 3/0482 715/739 |
| 2016/0026253 | A1* | 1/2016 | Bradski ................. H04N 13/128 345/8 |
| 2016/0109954 | A1* | 4/2016 | Harris .................... G06V 20/20 345/156 |
| 2017/0123487 | A1 | 5/2017 | Hazra et al. |
| 2017/0220856 | A1 | 8/2017 | Mohandes et al. |
| 2017/0255771 | A1* | 9/2017 | Miyakawa ............ G06F 3/0482 |
| 2017/0277684 | A1 | 9/2017 | Dharmarajan Mary |
| 2017/0277685 | A1 | 9/2017 | Takumi |
| 2017/0351910 | A1 | 12/2017 | Elwazer et al. |
| 2018/0048859 | A1 | 2/2018 | Episkopos et al. |
| 2018/0075659 | A1 | 3/2018 | Browy et al. |
| 2018/0114366 | A1 | 4/2018 | Ivers et al. |
| 2018/0158370 | A1 | 6/2018 | Pryor |
| 2019/0073525 | A1 | 3/2019 | Kim et al. |
| 2019/0339837 | A1 | 11/2019 | Furtwangler |
| 2019/0340426 | A1 | 11/2019 | Rangarajan et al. |
| 2020/0387214 | A1 | 12/2020 | Ravasz et al. |
| 2021/0011612 | A1 | 1/2021 | Dancie et al. |
| 2021/0074016 | A1 | 3/2021 | Li et al. |
| 2021/0090394 | A1* | 3/2021 | Russ .................. G07F 17/3209 |
| 2021/0166732 | A1 | 6/2021 | Shaburova et al. |
| 2021/0174034 | A1 | 6/2021 | Retek et al. |
| 2021/0240331 | A1 | 8/2021 | Olson et al. |
| 2021/0241529 | A1 | 8/2021 | Cowburn et al. |
| 2021/0303075 | A1 | 9/2021 | Cowburn et al. |
| 2021/0303077 | A1 | 9/2021 | Anvaripour et al. |
| 2021/0303140 | A1 | 9/2021 | Mourkogiannis |
| 2021/0382564 | A1 | 12/2021 | Blachly et al. |
| 2021/0382605 | A1 | 12/2021 | Edwards et al. |
| 2021/0397000 | A1 | 12/2021 | Rodriguez, II |
| 2021/0405761 | A1 | 12/2021 | Canberk |
| 2022/0046310 | A1* | 2/2022 | Shin ........................ G06F 3/038 |
| 2022/0121344 | A1 | 4/2022 | Pastrana Vicente et al. |
| 2022/0188539 | A1 | 6/2022 | Chan et al. |
| 2022/0206588 | A1 | 6/2022 | Canberk et al. |
| 2022/0300730 | A1 | 9/2022 | Eirinberg et al. |
| 2022/0300731 | A1 | 9/2022 | Eirinberg et al. |
| 2022/0326781 | A1 | 10/2022 | Hwang et al. |
| 2022/0334649 | A1 | 10/2022 | Hwang et al. |
| 2023/0350495 | A1 | 11/2023 | Vaday et al. |

FOREIGN PATENT DOCUMENTS

| | | | |
|---|---|---|---|
| KR | 20120132096 A | 12/2012 | |
| KR | 20160137253 A | 11/2016 | |
| KR | 20220158824 | 12/2022 | |
| WO | WO-2013093906 A1 | 6/2013 | |
| WO | WO-2016168591 A1 | 10/2016 | |
| WO | WO-2018170512 A1 | 9/2018 | |
| WO | WO-2019079895 A1 | 5/2019 | |
| WO | WO-2019094618 A1 | 5/2019 | |
| WO | 2022005687 | 1/2022 | |
| WO | 2022005693 | 1/2022 | |
| WO | 2022060549 | 3/2022 | |
| WO | 2022066578 | 3/2022 | |
| WO | 2022132381 | 6/2022 | |
| WO | 2022146678 | 7/2022 | |
| WO | 2022198182 | 9/2022 | |
| WO | 2022216784 | 10/2022 | |
| WO | 2022225761 | 10/2022 | |
| WO | 2022245765 | 11/2022 | |
| WO | WO-2023154544 A1 | 8/2023 | |
| WO | WO-2023196161 A1 | 10/2023 | |
| WO | WO-2023212633 A1 | 11/2023 | |

OTHER PUBLICATIONS

"U.S. Appl. No. 17/660,965, Final Office Action mailed Jun. 13, 2023", 22 pgs.

"U.S. Appl. No. 17/660,965, Non Final Office Action mailed Dec. 21, 2022", 20 pgs.

"U.S. Appl. No. 17/660,965, Response filed Mar. 21, 2023 to Non Final Office Action mailed Dec. 21, 2022", 13 pgs.

"International Application Serial No. PCT/US2023/012994, International Search Report mailed Jul. 13, 2023", 5 pgs.

"International Application Serial No. PCT/US2023/012994, Written Opinion mailed Jul. 13, 2023", 8 pgs.

"International Application Serial No. PCT/US2023/016950, International Search Report mailed Jun. 29, 2023", 4 pgs.

"International Application Serial No. PCT/US2023/016950, Written Opinion mailed Jun. 29, 2023", 4 pgs.

"International Application Serial No. PCT/US2023/066284, International Search Report mailed Jul. 24, 2023", 4 pgs.

"International Application Serial No. PCT/US2023/066284, Written Opinion mailed Jul. 24, 2023", 6 pgs.

Khalid, Muhammad Usman, et al., "Deep Workpiece Region Segmentation for Bin Picking", IEEE 15th International Conference on Automation Science and Engineering (CASE), IEEE, (Aug. 22, 2019), 7 pgs.

(56) References Cited

OTHER PUBLICATIONS

"U.S. Appl. No. 17/660,965, Non Final Office Action mailed Dec. 7, 2023", 25 pgs.
"U.S. Appl. No. 17/660,965, Response filed Sep. 13, 2023 to Final Office Action mailed Jun. 13, 2023", 14 pgs.
"U.S. Appl. No. 17/660,965, Response filed Mar. 7, 2024 to Non Final Office Action mailed Dec. 7, 2023", 11 pgs.
"U.S. Appl. No. 17/660,965, Notice of Allowance mailed Mar. 29, 2024", 10 pgs.

* cited by examiner

GESTURE-BASED APPLICATION INVOCATION

TECHNICAL FIELD

The present disclosure relates generally to software application management and more particularly to management of applications used in augmented and virtual reality.

BACKGROUND

A head-worn device may be implemented with a transparent or semi-transparent display through which a user of the head-worn device can view the surrounding environment. Such devices enable a user to see through the transparent or semi-transparent display to view the surrounding environment, and to also see objects (e.g., virtual objects such as a rendering of a 2D or 3D graphic model, images, video, text, and so forth) that are generated for display to appear as a part of, and/or overlaid upon, the surrounding environment. This is typically referred to as "augmented reality" or "AR." A head-worn device may additionally completely occlude a user's visual field and display a virtual environment through which a user may move or be moved. This is typically referred to as "virtual reality" or "VR." As used herein, the term AR refers to either or both augmented reality and virtual reality as traditionally understood, unless the context indicates otherwise.

A user of the head-worn device may access and use a computer software application to perform various tasks or engage in an entertaining activity. To use the computer software application, the user interacts with a user interface provided by the head-worn device.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
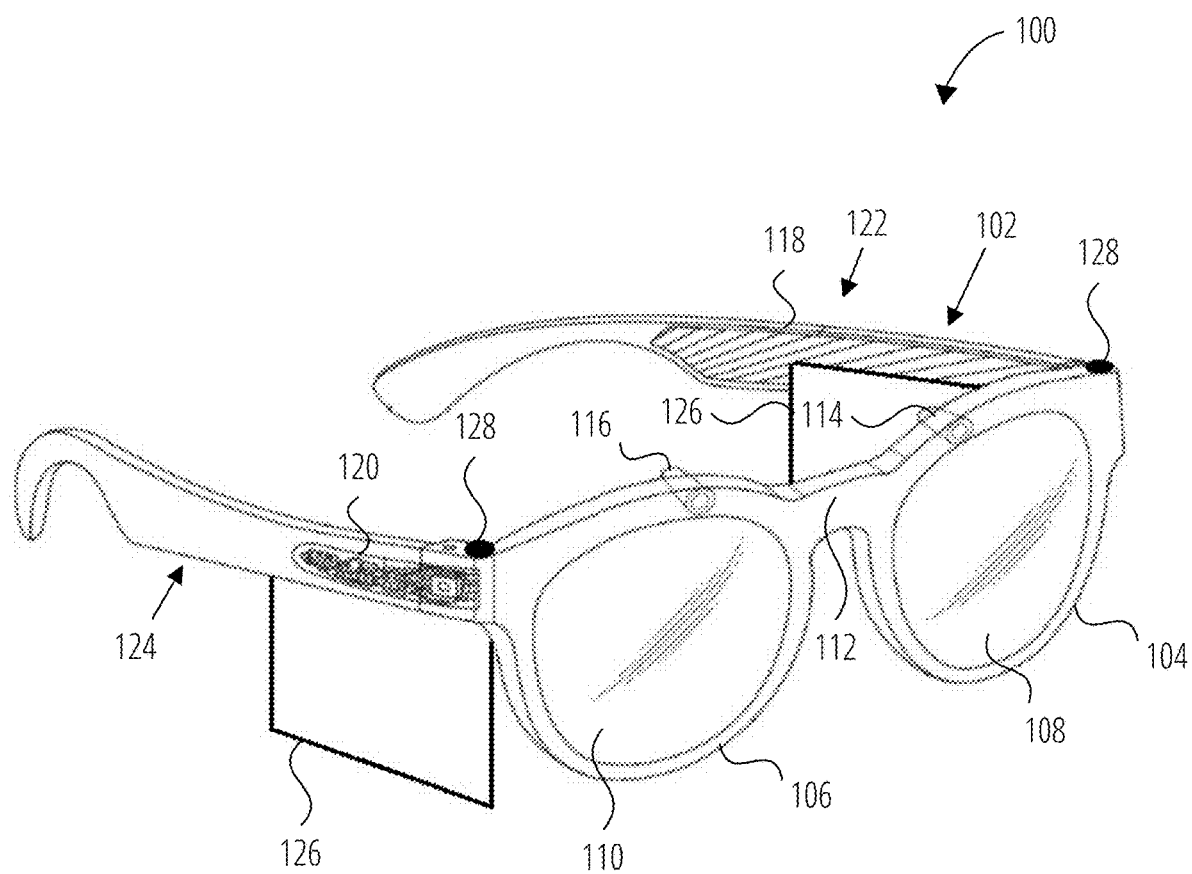
FIG. 1 is a perspective view of a head-worn device, in accordance with some examples.

AR devices may be limited when it comes to available computational resources and user input modalities. Unlike other mobile devices, such as mobile phones, it is more complicated for a user of an AR device to indicate user intent and invoke an action or application. When using a mobile phone, a user may go to a home screen and tap on a specific icon to start an application. However, because of a lack of a physical input device such as a touchscreen or keyboard, such interactions are not as easily performed on an AR device. Typically, users can indicate their intent by pressing a limited number of hardware buttons or using a small touchpad. Therefore, it would be desirable to have an input modality that allowed for a greater range of inputs that could be utilized by a user to indicate their intent through a user input.

An input modality that may be utilized with AR devices is hand tracking where a user is provided with a user interface that is displayed to the user in an AR overlay having a 2D or 3D rendering. The rendering is of a graphic model in 2D or 3D where virtual objects located in the model correspond to interactive elements of the user interface. In this way, the user perceives the virtual objects as objects within an overlay in the user's field of view of the real-world scene while wearing the AR device, or perceives the virtual objects as objects within a virtual world as viewed by the user while wearing the AR device. To allow the user to interact with the virtual objects, the AR device detects the user's hands and tracks their movement, location, and/or position to determine the user's interactions with the virtual objects.

Generation and display of the images forming the hand tracking user interface utilize computing and power resources that may be limited on an AR device. In addition, generation of a user interface implies that an application may already be running on the AR device that is capable of generating the user interface. Therefore, it would be desirable to have an input modality that did not utilize visual components of a user interface that rely on the generation of images and their subsequent provision to a user in order to prompt user interactions.

Utilization of gesture-based interactions as described herein provide for an improvement in the operations of AR devices. Gestures made by a user have the capability to provide a greater range of user inputs than having a keyboard or touchpad. For example, just considering a single hand having 5 fingers, there are $2^5$ possible distinct inputs considering finger positions as being either extended or curled against a palm of the hand.

Gestures provide an input modality suitable for use with AR devices. Gestures are made by a user moving and positioning portions of the user's body while those portions of the user's body are detectable by an AR device while the user is wearing the AR device. The detectable portions of the user's body may include portions of the user's upper body, arms, hands, and fingers. Components of a gesture may include the movement of the user's arms and hands, location of the user's arms and hands in space, and positions in which the user holds their upper body, arms, hands, and fingers. Gestures are useful in providing an AR experience for a user as they offer a way of providing user inputs into the AR device during an AR experience without having the user take their focus off of the AR experience. As an example, in an AR experience that is an operational manual for a piece of machinery, the user may simultaneously view the piece of machinery in the real-world scene through the lenses of the AR device, view an AR overlay on the real-world scene view of the machinery, and provide user inputs into the AR device.

As described in further detail herein, gestures are used as a user input modality in various types of user interfaces. In some examples, gestures are be utilized in an unprompted user interface that does not provide prompts to a user in order to elicit a user input or guide a user through a user interface dialog, that is, an AR device may provide a user interface that is unprompted and detect unprompted gestures made by a user. Accordingly, the utilization of unprompted gestures decreases the use of visual, auditory, or haptic prompts presented to a user allowing for a user interface to be implemented that does not use the imaging forming elements of the AR device or consume computational resources to generate and implement a user interface having visual, auditory and/or haptic prompts. For example, unprompted gestures are detected and utilized by an AR device without the use of visual, auditory, and/or haptic components of a user interface being provided to the user to prompt the user to make a user input or guide a user through a user interface dialog.

In an example, gestures are used as a user input modality in prompted user interfaces that provide visual, auditory, and/or haptic components that prompt or guide a user to input prompted gestures.

In an additional example, gestures are utilized in a user interface dialog having a user interface that is displayed to a user in an AR overlay having a rendering. Virtual objects are provided in the rendering as interactive elements that a user can interact with using detected gestures.

In some examples, gestures and hand tracking methodologies are combined to implement complex user interface dialogs. As an example, an unprompted gesture may be utilized to initiate a user interface dialog and within that user interface dialog, hand tracking methodologies may be used to prompt a user to make prompted gestures.

In additional examples, gestures are detected using contactless methodologies and these gestures are referred to herein as "contactless gestures." Contactless gestures are gestures that are detected without the use of physical input device that the user manipulates through contact with the physical input device, such as keyboards, touchscreens, keypads, switches or the like. Contactless gestures are sensed or detected using contactless imaging sensors that do not come into physical contact with portions of a user's body being detected. An example contactless imaging sensor having a temporal and spatial resolution sufficient to capture details of the portions of a user's body used to make the spatial resolution is a camera operating in visible or infrared spectrums. Therefore, a user's contactless gestures may be detected using one or more visible or infrared cameras to detect a user's gestures without the use of a physical input device. Other types of contactless imaging sensors having sufficient temporal and spatial resolution may be utilized as well such as sensors that utilize ultrasonic sound waves or electromagnetic waves outside of the visible and infrared spectrums.

In some examples, hand tracking is implemented using contactless methodologies where movement, location, and position of a user's hands are detected using one or more visible or infrared cameras without the use of a physical input device such as a sensor glove, a keyboard, a keypad, a touchscreen, a touchpad, one or more switches, or the like.

In an example use of gesture and hand tracking methodologies, a system for invoking applications and/or instructing an application to perform a specified action combines an unprompted gesture-based user interface as an initiating process and a prompted hand tracking user interface to resolve portions of a user interface dialog requiring prompted inputs.

In an application registration process, gestures are made available to applications and actions on an AR device and the applications may register to be notified about relevant gestures and offer interactive applications associated with those gestures to the user. As a result of the application registration process, a set of registered applications and actions having metadata associating applications and application actions with gestures is created and stored as well as a set of eligible tags having semantic metadata identifying gestures that can be used to help map specific gestures to applications and actions.

During a scanning process of an AR device, an unprompted user interface utilizing gestures as an input modality is provided to a user. To invoke an application or an action of an application, the user performs a specified gesture that is detected by the AR device. The AR device provides the detected gesture to an action manager that associates applications or application actions with the detected gesture.

If there is one application or action associated with a detected gesture, the action manager invokes the application or action. If more than one application or action has been registered in association with a particular gesture resulting in the user's intent being ambiguous, the action manager disambiguates the user's intent using a prompted user interface that uses prompts and hand tracking to resolve the ambiguity. The prompted user interface provides identifying information of the applications and/or application actions to the user as visual prompts so that the user may make a selection of the desired application or action.

When the action manager invokes an application, the action manager may pass along, as input parameters, captured video frame data, and further contextual and operational information, such as an action type and any detected tags. The invoked application may receive the input parameter data using an API hook that may be triggered by the manager when starting the application. The application may then begin executing or execute the intended action.

Other technical features may be readily apparent to one skilled in the art from the following figures, descriptions, and claims.

FIG. 1 is a perspective view of a head-worn AR device (e.g., glasses 100 of FIG. 1), in accordance with some examples. The glasses 100 can include a frame 102 made from any suitable material such as plastic or metal, including any suitable shape memory alloy. In one or more examples, the frame 102 includes a first or left optical element holder 104 (e.g., a display or lens holder) and a second or right optical element holder 106 connected by a bridge 112. A first or left optical element 108 and a second or right optical element 110 can be provided within respective left optical element holder 104 and right optical element holder 106. The right optical element 110 and the left optical element 108 can be a lens, a display, a display assembly, or a combination of the foregoing. Any suitable display assembly can be provided in the glasses 100.

The frame 102 additionally includes a left arm or temple piece 122 and a right arm or temple piece 124. In some examples the frame 102 can be formed from a single piece of material so as to have a unitary or integral construction.

The glasses 100 can include a computing device, such as a computer 120, which can be of any suitable type so as to be carried by the frame 102 and, in one or more examples, of a suitable size and shape, so as to be partially disposed in one of the temple piece 122 or the temple piece 124. The computer 120 can include one or more processors with memory, wireless communication circuitry, and a power source. As discussed below, the computer 120 comprises low-power circuitry, high-speed circuitry, and a display processor. Various other examples may include these elements in different configurations or integrated together in different ways. Additional details of aspects of computer 120 may be implemented as illustrated by the data processor 902 discussed below.

The computer 120 additionally includes a battery 118 or other suitable portable power supply. In some examples, the battery 118 is disposed in left temple piece 122 and is electrically coupled to the computer 120 disposed in the right temple piece 124. The glasses 100 can include a connector or port (not shown) suitable for charging the battery 118, a wireless receiver, transmitter or transceiver (not shown), or a combination of such devices.

The glasses 100 include a first or left camera 114 and a second or right camera 116. Although two cameras are depicted, other examples contemplate the use of a single or additional (i.e., more than two) cameras. In one or more examples, the glasses 100 include any number of input sensors or other input/output devices in addition to the left camera 114 and the right camera 116. Such sensors or input/output devices can additionally include biometric sensors, location sensors, motion sensors, and so forth.

In some examples, the left camera 114 and the right camera 116 provide video frame data for use by the glasses 100 to extract 3D information from a real-world scene.

The glasses 100 may also include a touchpad 126 mounted to or integrated with one or both of the left temple piece 122 and right temple piece 124. The touchpad 126 is generally vertically-arranged, approximately parallel to a user's temple in some examples. As used herein, generally vertically aligned means that the touchpad is more vertical than horizontal, although potentially more vertical than that. Additional user input may be provided by one or more buttons 128, which in the illustrated examples are provided on the outer upper edges of the left optical element holder 104 and right optical element holder 106. The one or more touchpads 126 and buttons 128 provide a means whereby the glasses 100 can receive input from a user of the glasses 100.

Figure 2:
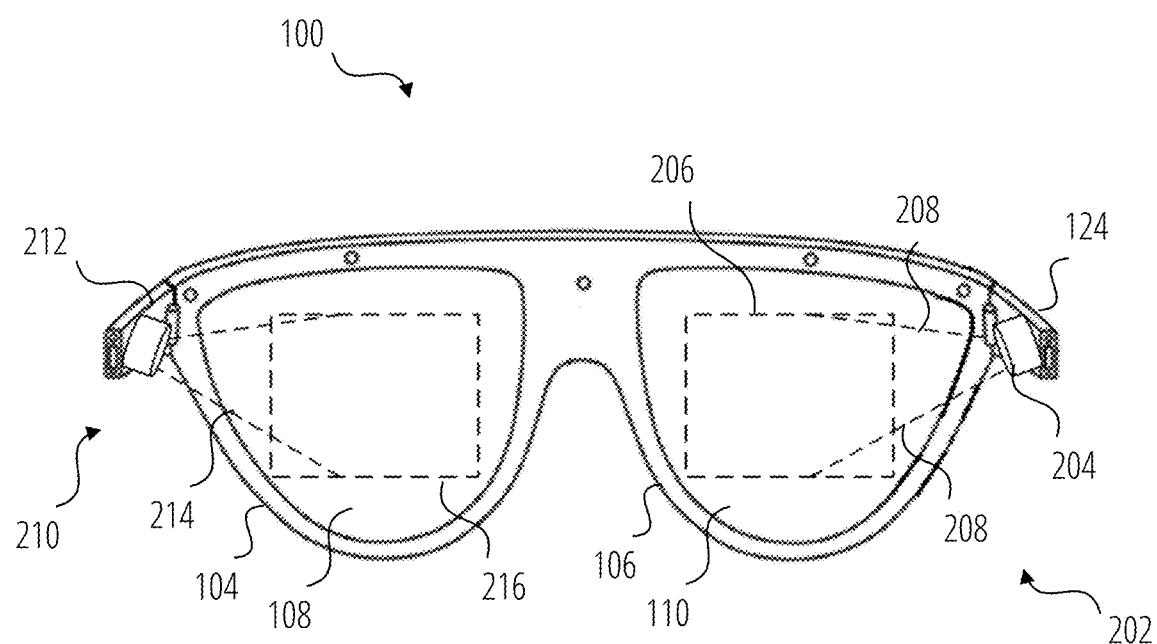
FIG. 2 is a further view of the head-worn device of FIG. 1, in accordance with some examples.

FIG. 2 illustrates the glasses 100 from the perspective of a user. For clarity, a number of the elements shown in FIG. 1 have been omitted. As described in FIG. 1, the glasses 100 shown in FIG. 2 include left optical element 108 and right optical element 110 secured within the left optical element holder 104 and the right optical element holder 106 respectively.

The glasses 100 include forward optical assembly 202 comprising a right projector 204 and a right near eye display 206, and a forward optical assembly 210 including a left projector 212 and a left near eye display 216.

In some examples, the near eye displays are waveguides. The waveguides include reflective or diffractive structures (e.g., gratings and/or optical elements such as mirrors, lenses, or prisms). Light 208 emitted by the projector 204 encounters the diffractive structures of the waveguide of the near eye display 206, which directs the light towards the right eye of a user to provide an image on or in the right optical element 110 that overlays the view of the real-world scene seen by the user. Similarly, light 214 emitted by the projector 212 encounters the diffractive structures of the waveguide of the near eye display 216, which directs the light towards the left eye of a user to provide an image on or in the left optical element 108 that overlays the view of the real-world scene seen by the user. The combination of a GPU, the forward optical assembly 202, the left optical element 108, and the right optical element 110 provide an optical engine of the glasses 100. The glasses 100 use the optical engine to generate an overlay of the real-world scene view of the user including display of a user interface to the user of the glasses 100.

It will be appreciated however that other display technologies or configurations may be utilized within an optical engine to display an image to a user in the user's field of view. For example, instead of a projector 204 and a waveguide, an LCD, LED or other display panel or surface may be provided.

In use, a user of the glasses 100 will be presented with information, content and various user interfaces on the near eye displays. As described in more detail herein, the user can then interact with the glasses 100 using a touchpad 126 and/or the buttons 128, voice inputs or touch inputs on an associated device (e.g. client device 926 illustrated in FIG. 9), and/or hand movements, locations, and positions detected by the glasses 100.

Figure 3:
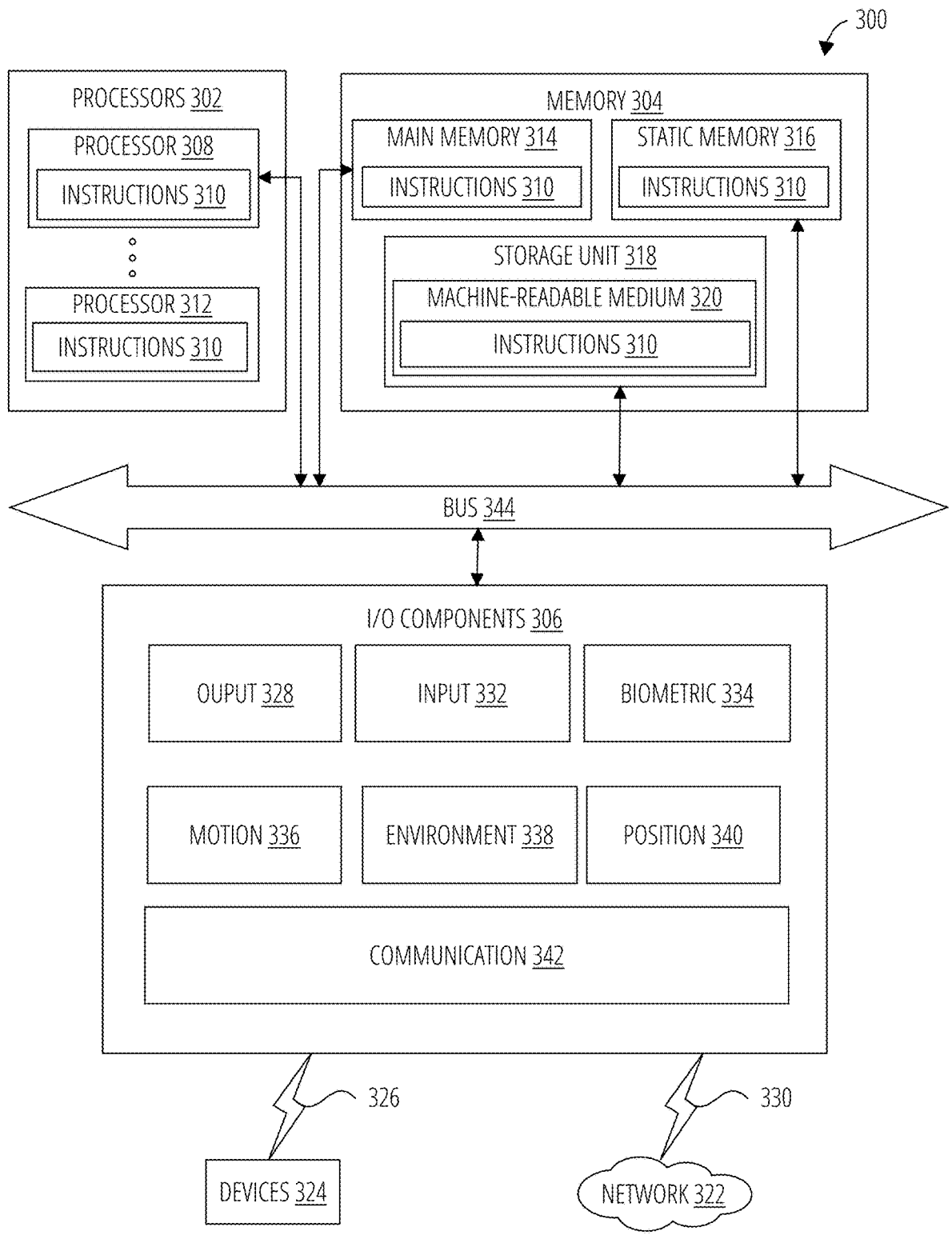
FIG. 3 is a diagrammatic representation of a machine, in the form of a computing apparatus within which a set of instructions can be executed for causing the machine to perform any one or more of the methodologies discussed herein in accordance with some examples.

FIG. 3 is a diagrammatic representation of a machine 300 within which instructions 310 (e.g., software, a program, an application, an applet, an app, or other executable code) for causing the machine 300 to perform any one or more of the methodologies discussed herein may be executed. The machine 300 may be utilized as a computer 120 of glasses 100 of FIG. 1. For example, the instructions 310 may cause the machine 300 to execute any one or more of the methods described herein. The instructions 310 transform the general, non-programmed machine 300 into a particular machine 300 programmed to carry out the described and illustrated functions in the manner described. The machine 300 may operate as a standalone device or may be coupled (e.g., networked) to other machines. In a networked deployment, the machine 300 may operate in the capacity of a server machine or a client machine in a server-client network environment, or as a peer machine in a peer-to-peer (or distributed) network environment. The machine 300 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a head-worn device (e.g., a smart watch), a smart home device (e.g., a smart appliance), other smart devices, a web appliance, a network router, a network switch, a network bridge, or any machine capable of executing the instructions 310, sequentially or otherwise, that specify actions to be taken by the machine 300. Further, while a single machine 300 is illustrated, the term "machine" may also be taken to include a collection of machines that individually or jointly execute the instructions 310 to perform any one or more of the methodologies discussed herein.

The machine 300 may include processors 302, memory 304, and I/O components 306, which may be configured to communicate with one another via a bus 344. In an example, the processors 302 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 308 and a processor 312 that execute the instructions 310. The term "processor" is intended to include multi-core processors that may comprise two or more independent processors (sometimes referred to as "cores") that may execute instructions contemporaneously. Although FIG. 3 shows multiple processors 302, the machine 300 may include a single processor with a single core, a single processor with multiple cores (e.g., a multi-core processor), multiple processors with a single core, multiple processors with multiples cores, or any combination thereof.

The memory 304 includes a main memory 314, a static memory 316, and a storage unit 318, both accessible to the processors 302 via the bus 344. The main memory 304, the static memory 316, and storage unit 318 store the instructions 310 embodying any one or more of the methodologies or functions described herein. The instructions 310 may also reside, completely or partially, within the main memory 314, within the static memory 316, within machine-readable medium 320 within the storage unit 318, within one or more of the processors 302 (e.g., within the processor's cache memory), or any suitable combination thereof, during execution thereof by the networked system 900.

The I/O components 306 may include a wide variety of components to receive input, provide output, produce output, transmit information, exchange information, capture measurements, and so on. The specific I/O components 306 that are included in a particular machine will depend on the type of machine. For example, portable machines such as mobile phones may include a touch input device or other such input mechanisms, while a headless server machine will likely not include such a touch input device. It will be appreciated that the I/O components 306 may include many other components that are not shown in FIG. 3. In various examples, the I/O components 306 may include output components 328 and input components 332. The output components 328 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 332 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further examples, the I/O components 306 may include biometric components 334, motion components 336, environmental components 338, or position components 340, among a wide array of other components. For example, the biometric components 334 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 336 include acceleration sensor components (e.g., accelerometer), gravitation sensor components, rotation sensor components (e.g., gyroscope), and so forth. The environmental components 338 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals associated to a surrounding physical environment. The position components 340 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 306 further include communication components 342 operable to couple the networked system 900 to a network 322 or devices 324 via a coupling 330 and a coupling 326, respectively. For example, the communication components 342 may include a network interface component or another suitable device to interface with the network 322. In further examples, the communication components 342 may include wired communication components, wireless communication components, cellular communication components, Near Field Communication (NFC) components, Bluetooth® components (e.g., Bluetooth® Low Energy), WiFi® components, and other communication components to provide communication via other modalities. The devices 324 may be another machine or any of a wide variety of peripheral devices (e.g., a peripheral device coupled via a USB).

Moreover, the communication components 342 may detect identifiers or include components operable to detect identifiers. For example, the communication components 342 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 342, such as location via Internet Protocol (IP) geolocation, location via Wi-Fi® signal triangulation, location via detecting an NFC beacon signal that may indicate a particular location, and so forth.

The various memories (e.g., memory 304, main memory 314, static memory 316, and/or memory of the processors 302) and/or storage unit 318 may store one or more sets of instructions and data structures (e.g., software) embodying or used by any one or more of the methodologies or functions described herein. These instructions (e.g., the instructions 310), when executed by processors 302, cause various operations to implement the disclosed examples.

The instructions 310 may be transmitted or received over the network 322, using a transmission medium, via a network interface device (e.g., a network interface component included in the communication components 342) and using any one of a number of well-known transfer protocols (e.g., hypertext transfer protocol (HTTP)). Similarly, the instructions 310 may be transmitted or received using a transmission medium via the coupling 326 (e.g., a peer-to-peer coupling) to the devices 324.

Figure 4:
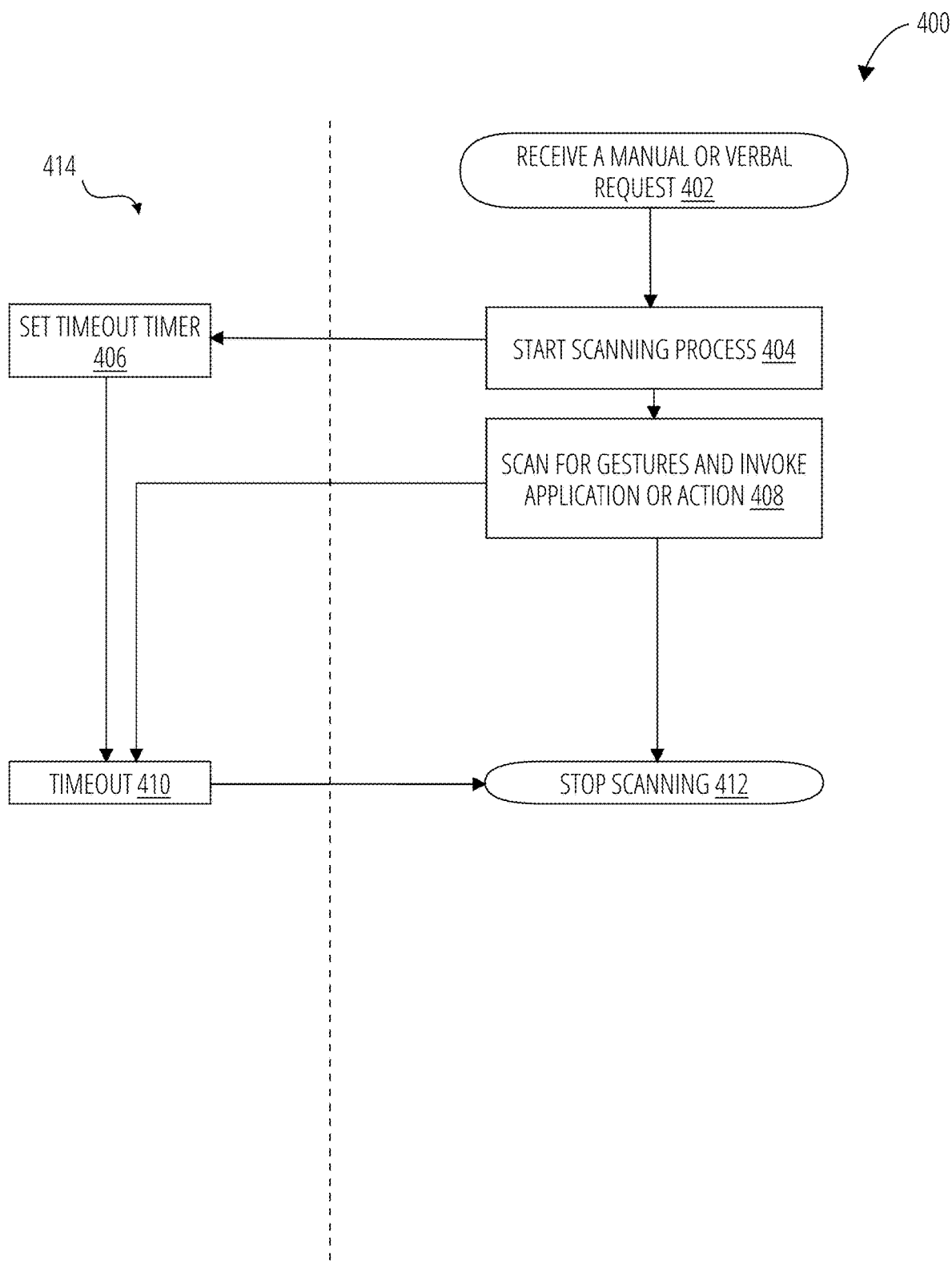
FIG. 4 is a process flow diagram of a gesture-based application invocation process of an AR device in accordance with some examples.

FIG. 4 is a process flow diagram of a gesture-based application invocation process 400 of an AR device, such as glasses 100, in accordance with some examples. The gesture-based application invocation process 400 may be used by the AR device to invoke an application or invoke an action of an application based on a user input of one or more gestures.

In operation 402, the AR device receives a manual or verbal request to initiate a gesture scanning process. For example, the AR device detects audio received via an acoustic sensor component of environmental components 338 of the AR device and determines that the received audio corresponds to a request to initiate a gesture scanning process (e.g., "start glasses"). In another example, the AR device detects movement of the user, such as a movement of the user's fingers, hand, arm, or other body part, and determines that the movement of the user corresponds to a request to initiate a gesture scanning process. The AR device may determine that the audio or movement corresponds to the request to initiate a gesture scanning process by mapping the audio or gesture to an action or application of a plurality of actions and applications in a datastore on the AR device or a computing device or server system.

In operation 404, the AR device starts the gesture scanning process and in operation 406, the AR device sets a timeout timer for a specified amount of time in a timeout process, subprocess, or thread 414. The timeout timer ensures that the gesture-based application invocation process 400 will not hang if no gesture is detected in the specified amount of time.

Figure 5:
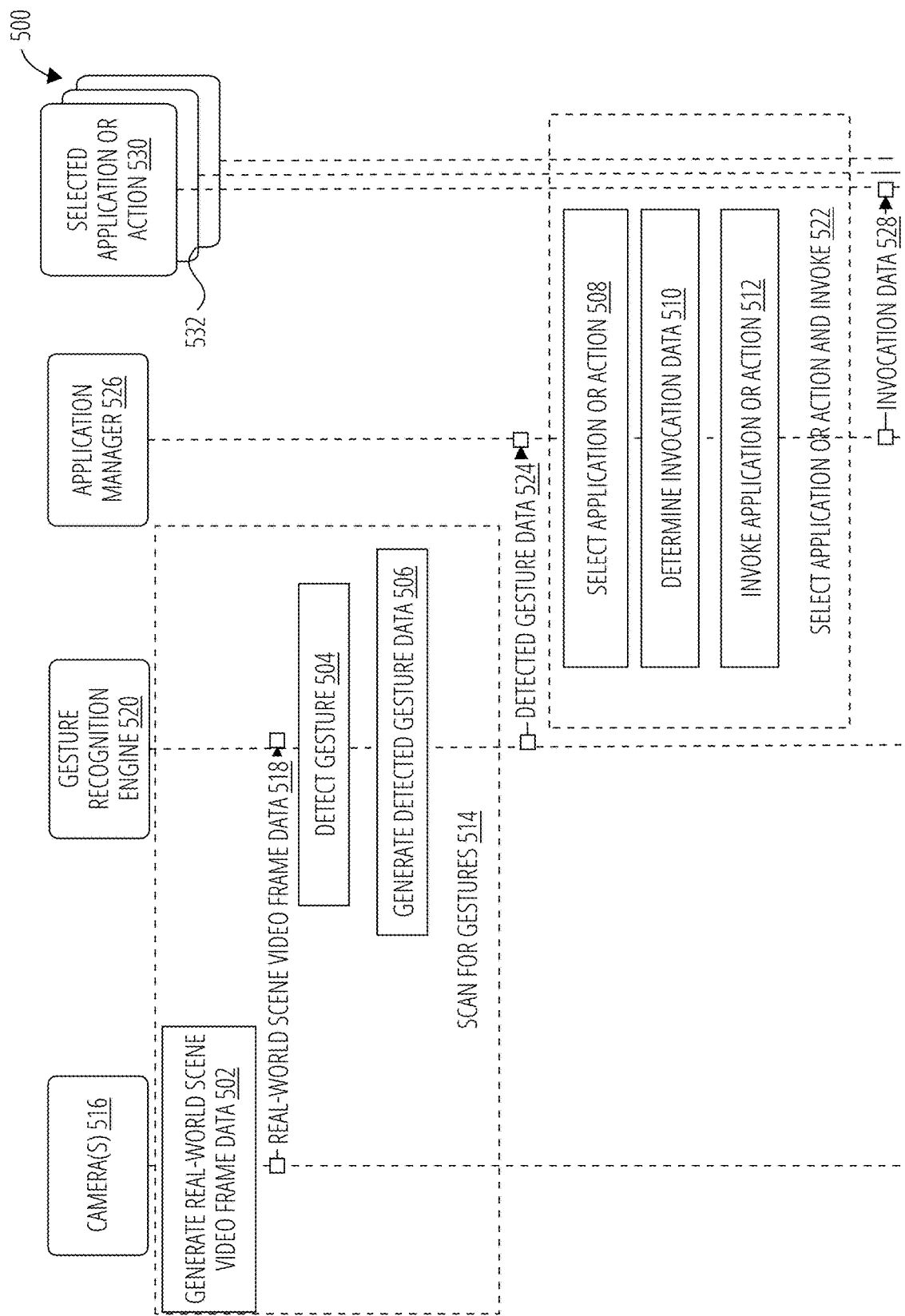
FIG. 5 is a sequence diagram of an example gesture-based application invocation process of an AR device in accordance with some examples.

In operation 408, the AR device scans for gestures and invokes an application or an action of an application that is associated with a detected gesture as more fully described in reference to scanning and invocation process 500 of FIG. 5. If the AR device does not detect a gesture in the specified amount or time, or does not select an application or action, the scanning and invocation process times out in operation 410 and the AR device stops scanning in operation 412.

FIG. 5 is a sequence diagram of a scanning and invocation process 500 used by an AR device, such as glasses 100, to scan for gestures and invoke an application or action based on a detected gesture in accordance with some examples. During subprocess 514, the AR device utilizes one or more cameras 516 and gesture recognition engine 520 to scan for and detect gestures made by a user. In operation 502 of subprocess 514, the AR device uses the one or more cameras 516 of the AR device to generate real-world scene video frame data 518 of a real-world scene from a perspective of a user of the AR device. Included in the real-world scene video frame data 518 are gesture video frame data of the detectable portions of the user's body including portions of the user's upper body and the user's arms, hands, and fingers. Components of a gesture may include the movement of portions of the user's upper body, arms, and hands as the user makes a gesture; locations of the user's arms and hands in space as the user makes the gesture; and positions in which the user holds their upper body, arms, hands, and fingers as the user makes the gesture. The one or more cameras 516 communicate the real-world scene video frame data 518 to the gesture recognition engine 520.

The gesture recognition engine 520 receives the real-world scene video frame data 518 and in operation 504 utilizes the real-world scene video frame data 518 to detect a gesture based on the gesture video frame data included in the real-world scene video frame data 518. In an example, the gesture recognition engine 520 uses feature extraction methodologies to extract feature data of the user's upper body, arms, hands, and fingers from the gesture video frame data. The gesture recognition engine 520 uses object identification methodologies to identify landmarks on the user's upper body, arms, hands, and fingers based on the feature data and generates current skeletal models of the user's upper body, arms, hands, and fingers based on the landmarks. The gesture recognition engine 520 compares the current skeletal models to gesture skeletal models that were previously generated using machine learning methodologies. The gesture recognition engine 520 determines a detected gesture on the basis of the comparison of the current skeletal models with the gesture skeletal models.

In operation 506, the gesture recognition engine 520 generates detected gesture data 524 based on the detected gesture. The detected gesture data 524 includes gesture identification data that identifies the detected gesture.

The gesture recognition engine 520 communicates the detected gesture data 524 to an application manager 526. In subprocess 522, in operation 508 the application manager 526 selects an application or action 530 from a set of registered applications and actions as more fully described in reference to application or action selection process 600 of FIG. 6C. The selected application or selected action is selected based on being associated with the detected gesture identified by the gesture identification data included in the detected gesture data 524.

In operation 510, the application manager 526 determines invocation data 528 that will be utilized by the invoked selected application or action 530 on startup. The invocation data 528 includes input parameter data for the invoked selected application or selected action, such as, but not limited to, real-world scene video frame data 518 captured during the gesture scanning subprocess 514, contextual information related to the operational environment of the AR device, a physical location determined from a GPS sensor or the like, a head position of a user wearing the AR device detected by an accelerometer or other sensor of the AR device, and operational information such as an action type or function, and any detected tags.

In operation 512, the application manager 526 invokes the selected application or selected action selected from the set of registered applications and actions 530 that are known to the application manager 526. The application manager 526 invokes the selected application or action 530 and communicates the invocation data 528 to the invoked selected application or action 530.

In some examples, when an application is selected, the AR device loads the selected application from a datastore into working memory and begins executing the selected application while passing the input parameter data to the invoked application. In additional examples, the invoked application receives the input parameter data using an API hook triggered by the application manager 526 when invoking the selected application 530.

In some examples, when an action is selected, the action may be an action, service, or function of a software application already running in another process of the AR device and invoking the selected action includes passing a message to the already running application to perform the selected action.

Figure 8A:
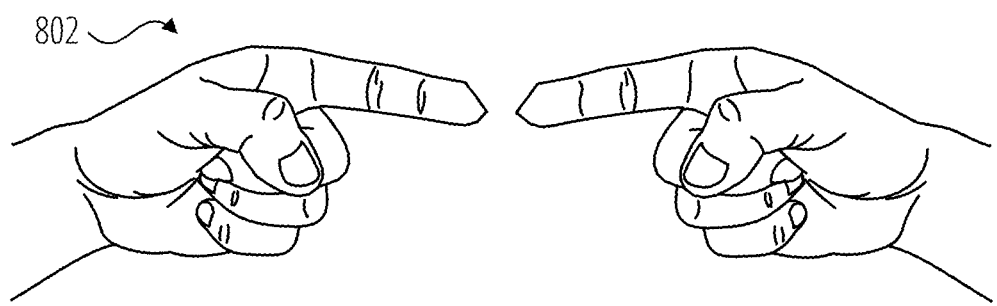
FIG. 8A depicts a gesture indicating that a user wants to see a battery level displayed in accordance with some examples.

In an example, in reference to gesture 802 of FIG. 8A, the detected gesture is one of a user holding their hands in a position that their index fingers are extended while the remaining fingers are curled over their respective palms, and the user touches a distal phalanx of each index finger together. An AR device determines that the user's intent in making the gesture is to instruct the AR device to invoke a battery level application. Based on the detected gesture, the AR device selects an action of a battery level application to cause a display of a charge level of a battery of the AR device.

Figure 8B:
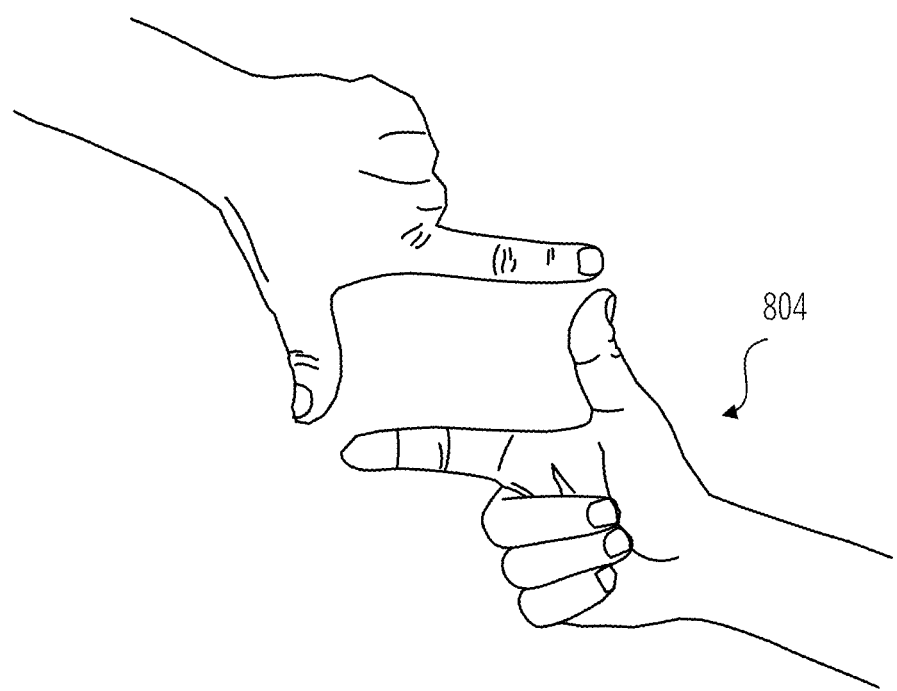
FIG. 8B depicts a gesture indicating that a user wants to invoke a camera application in accordance with some examples.

In an additional example, in reference to gesture 804 of FIG. 8B, the detected gesture is one of a user holding their hands in a position to indicate a rectangular frame suggesting the user is viewing a real-world scene on a screen of a smartphone being used in camera mode. An AR device determines that the user's intent in making the gesture is to instruct the AR device to invoke a camera application and take a picture using the AR device's camera or cameras. Based on the detected gesture, the AR device selects an action of a camera application and records an image using the camera or cameras.

Figure 8C:
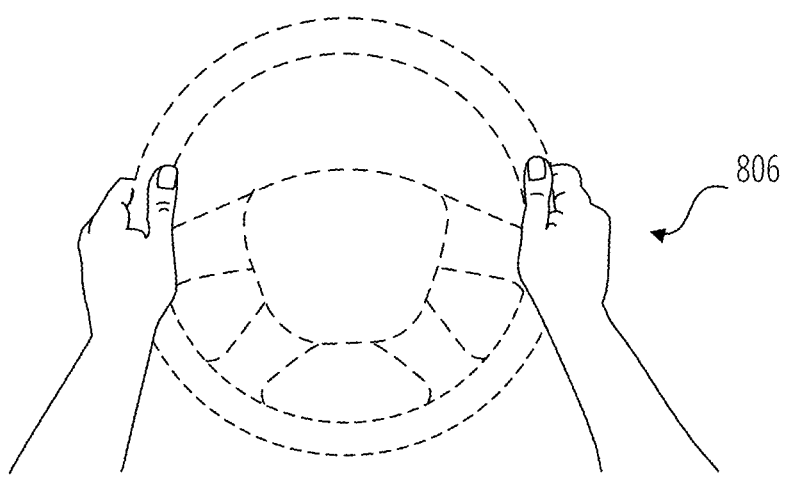
FIG. 8C depicts a gesture indicating that a user wants to invoke a navigation application in accordance with some examples.

In an additional example, in reference to gesture 806 of FIG. 8C, the detected gesture is one of a user holding their hands as if the user is holding a steering wheel of an automobile. An AR device determines that the user's intent in making the gesture is to instruct the AR device to invoke a navigation application. Based on the detected gesture, the AR device selects the navigation application and invokes the navigation application.

Figure 8D:
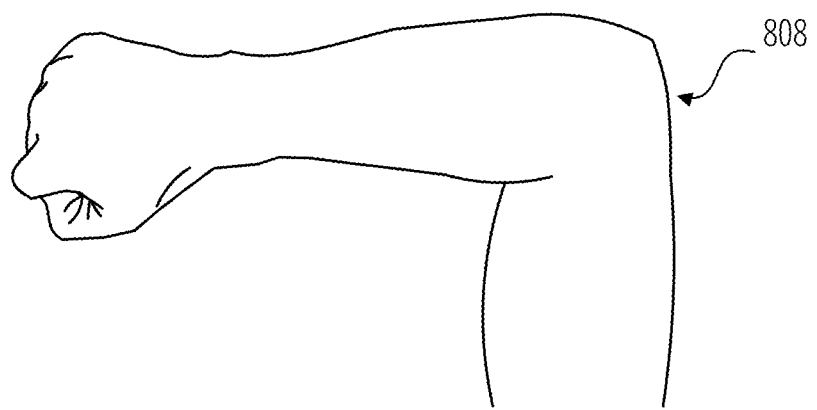
FIG. 8D depicts a gesture indicating that a user wants to invoke a time or watch application in accordance with some examples.

In an additional example, in reference to gesture 808 of FIG. 8D, the detected gesture is one of the user making a balled first with a hand and then bending a respective arm at an elbow so as to appear that the user is looking at a wristwatch. An AR device determines that the user's intent in making the gesture is to instruct the AR device to invoke a clock application. Based on the detected gesture, the AR device selects an action of a clock application that provides a time of day to the user and invokes the action.

Figure 8E:
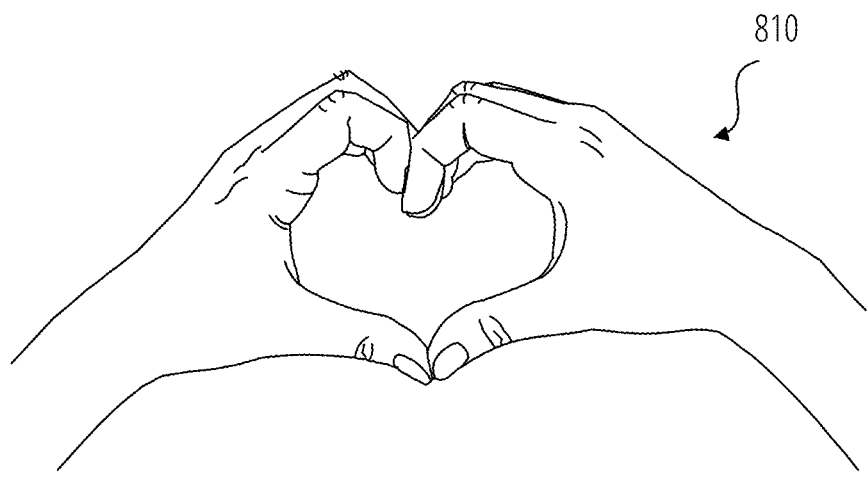
FIG. 8E depicts a gesture indicating that the user wants to invoke a health monitoring application in accordance with some examples.

In an additional example, in reference to gesture 812 of FIG. 8E, the detected gesture is one of the user partially curling their fingers over the finger's respective palms, touching a top surface of the finger's distal phalanges together, and touching each thumb together at their distal phalanges such that the user's hands outline a shape of a heart. An AR device determines that the user's intent in making the gesture is to instruct the AR device to invoke a fitness application. Based on the detected gesture, 812 AR device selects a fitness application and invokes the fitness application.

Figure 8F:
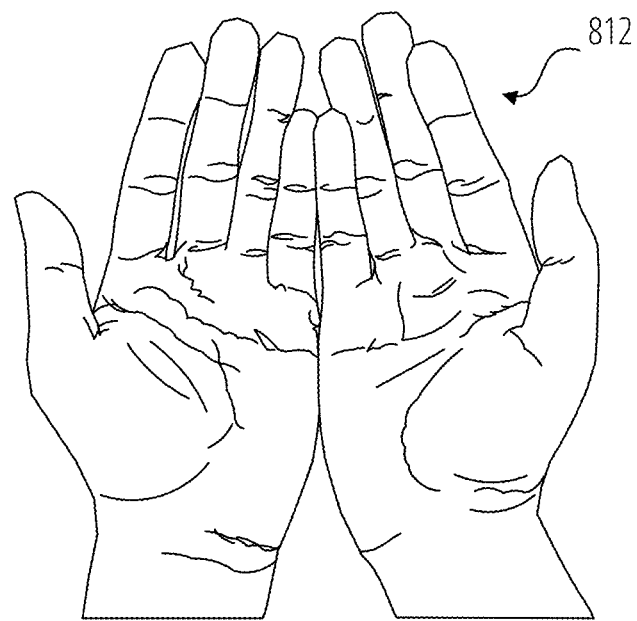
FIG. 8F depicts a gesture indicating that the user wants to close an application in accordance with some examples.

In an additional example, in reference to gesture 812 of FIG. 8F, the detected gesture may be one of the user extending the fingers of each hand, turning their hands so that they can view their palms, and touching an outer edge of each little finger and palm together as if the user were about to cover their eyes. An AR device determines that the user's intent in making the gesture is to instruct the AR device to power down. Based on the detected gesture, the AR device selects an action of a power down application of the AR device and powers down the AR device.

In some examples, an application manager 526 performs the functions of a gesture recognition engine by utilizing various APIs and system libraries to receive and process the real-world scene video frame data 518 from the one or more one or more cameras 516 to detect gestures and generate detected gesture data 524.

In some examples the AR device provides an unprompted user interface in order to solicit a user input in the form of a gesture. For example, a user is not prompted to make a user input or guided through a user interface using visual, auditory, and/or haptic components of a user interface provided to the user. To do so, visual prompts of a user interface are not displayed to a user such that the user is not prompted to make a user input by interacting with the visual components. As an additional example, auditory prompts of a user interface are not provided to the user such that the user is not prompted to make a user input by making a specific gesture. As an additional example, haptic prompts of a user interface are not provided to the user such that the user is not prompted to make a user input by making a specific gesture. In some such examples, an AR device provides an unprompted user interface during subprocess 514 as the AR device scans for gestures.

In some embodiments, an AR device provides a user interface that does not use a physical input device such as a sensor glove, a keyboard, a keypad, a touchscreen, a touchpad, one or more switches, or the like in order to detect a user input in the form of contactless gestures. Such an interface is herein termed a "contactless user interface." A contactless user interface utilizes contactless imaging sensors that do not come into physical contact with portions of a user's body. An example contactless imaging sensor having a temporal and spatial resolution sufficient to capture details of the portions of a user's body used to make the spatial resolution is a camera operating in visible or infrared spectrums. Other types of contactless imaging sensors having sufficient temporal and spatial resolution may be utilized as well such as sensors that utilize ultrasonic sound waves or electromagnetic waves outside of the visible and infrared spectrums In some examples, the AR device scans for gestures while providing a user interface that is both contactless and unprompted, herein termed a "contactless unprompted user interface" to a user in order to solicit a contactless unprompted gesture from a user. As an example, during a scanning process, the AR device does not provide any prompts to the user whether they be visual, audible, or haptic, and the AR device scans for gestures using a contactless imaging sensor. A gesture detected while providing a contactless unprompted user interface is herein termed a "contactless unprompted gesture."

In some examples, the AR device provides a user interface that is contactless and prompted, herein termed a "contactless prompted user interface." For example, the AR device provides visual, audible, and/or haptic prompts to a user and detects gestures made by the user using contactless imaging sensors. A gesture detected while providing a contactless prompted user interface is herein termed a "contactless prompted gesture."

Figure 6A:
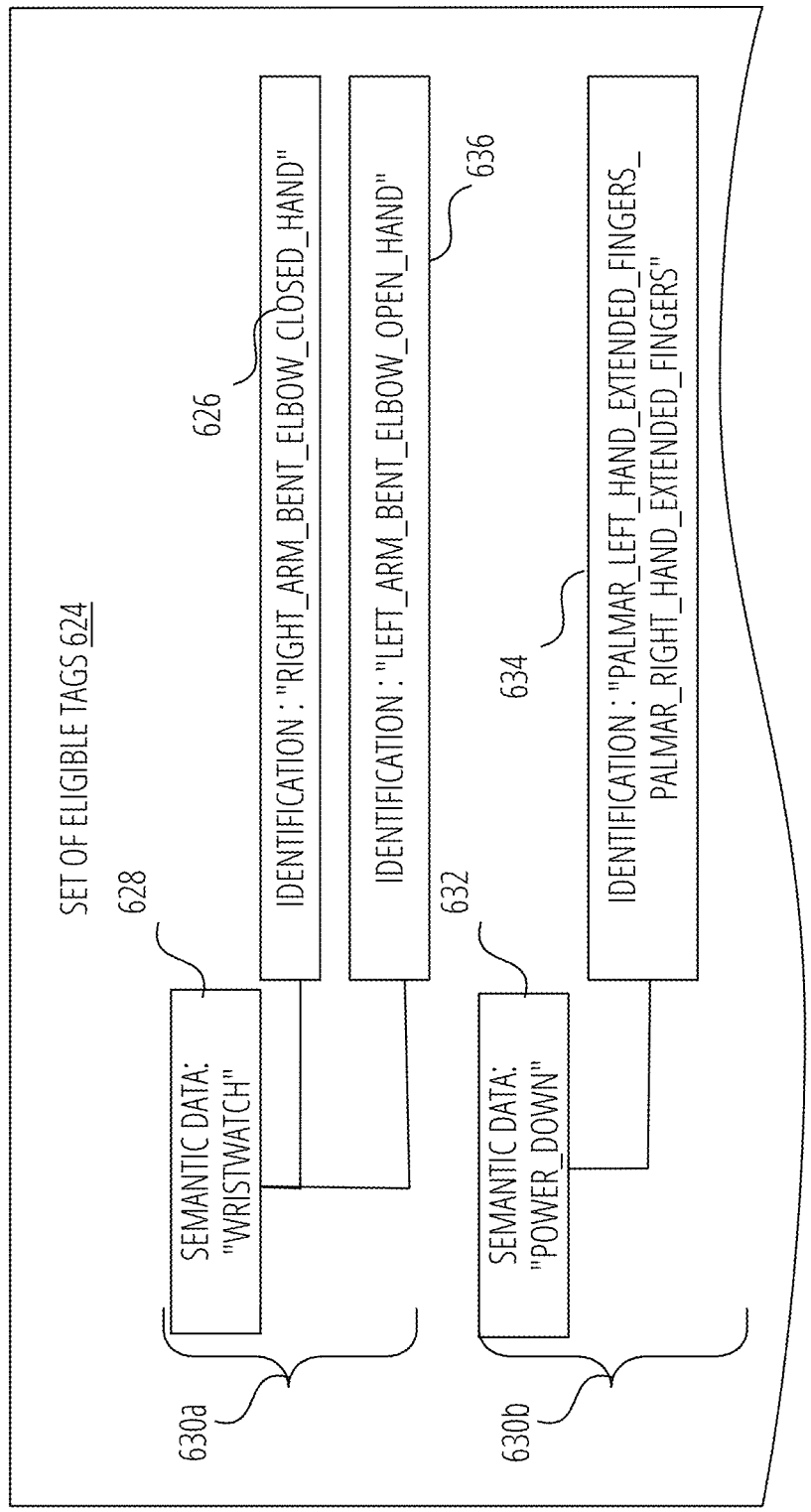
FIG. 6A is a data structure diagram of gesture metadata in accordance with some examples.

FIG. 6A is a data structure diagram of gesture metadata in the form of a set of eligible tags 624 used by an application or action selection process 600 to determine an eligible tag for a gesture detected by an AR device in accordance with some examples. An eligible tag, such as eligible tags 630a and 630b, includes metadata that associate gesture identification data 626 identifying a detected gesture based on physical attributes of the detected gesture with semantic data 628 that describe the detected gesture on a semantic level within the context of the application or action selection process 600. For example, the gesture identification data 626 identifies gesture 808 of FIG. 8D as "RIGHT_ARM_BENT_ELBOW_CLOSED_HAND" and eligible tag 630a associates the gesture identification data 626 with the semantic data 628 "WRISTWATCH" indicating that the gesture 808 when detected by the AR device is given a meaning of "wristwatch".

In some examples, semantic data will be associated with a single set of gesture identification data of a gesture, such as semantic data 632 "POWER_DOWN" with gesture identification data 634 for a gesture, such as gesture 812 of FIG. 8F, "PALMAR_LEFT_HAND_EXTENDED_FINGERS_PALMAR_RIGHT_HAND_EXTENDED_FINGERS."

In additional examples, the use of eligible tags provides a methodology to associate multiple gesture identification data with a single set of semantic data, thus allowing for gestural synonyms. For example, the gesture identification data 636 "LEFT_ARM_BENT_ELBOW_OPEN_HAND" is associated by eligible tag 630a with semantic data 628 "WRISTWATCH" along with gesture identification data 626 "RIGHT_ARM_BENT_ELBOW_CLOSED_HAND." By associating both gesture identification data to the same semantic data defines gestures identified as "RIGHT_ARM_BENT_ELBOW_CLOSED_HAND" and "LEFT_ARM_BENT_ELBOW_OPEN_HAND" as gestural synonyms.

Figure 6B:
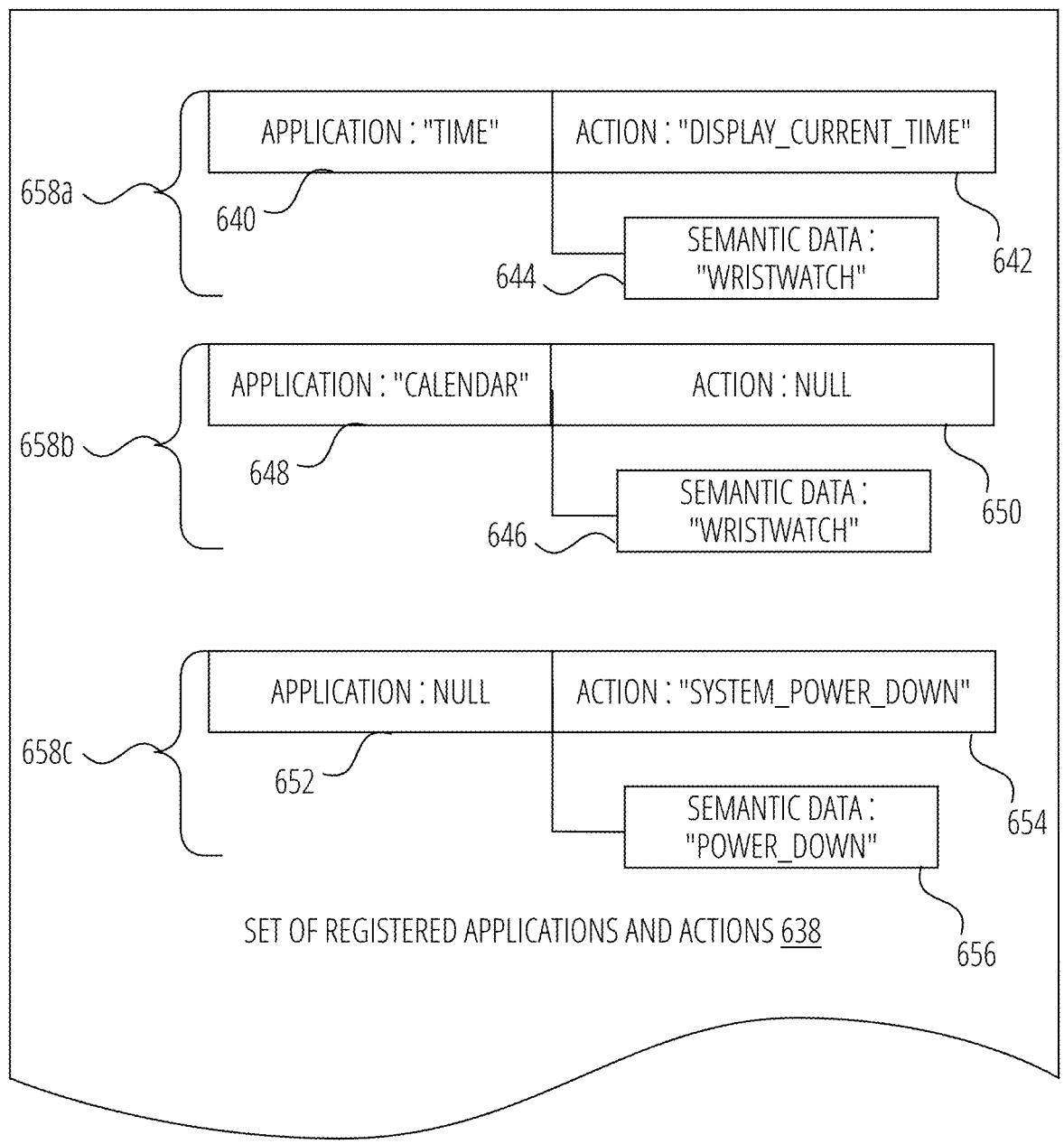
FIG. 6B is a data structure diagram of application and action metadata in accordance with some examples.

FIG. 6B is a data structure diagram of application and action metadata in a form of a set of registered applications and actions 638 used by the application or action selection process 600 to map an eligible tag to an application or action in accordance with some examples. A registration tag, such as registration tags 658a, 658b, and 658c, includes metadata that associates application identification data of an application, such as application identification data 640 and action identification data of an action, such as action identification data 642, to semantic data of a gesture, such as semantic data 644. For example, application identification data 640 identifying an application that provides timing services within an AR device, namely "TIME", and action identification data 642 identifying an action of the application, namely "DISPLAY_CURRENT_TIME" are associated with semantic data 644 "WRISTWATCH". When the AR device detects a gesture associated with semantic data 644 "WRISTWATCH", the AR device invokes the "TIME" application, and the "TIME" application executes a "DISPLAY_CURRENT_TIME" action to display a current time to a user of the AR device.

In some examples, two or more applications or actions are associated with a set of semantic data. As illustrated, semantic data 644 and semantic data 646 have the same value, namely "WRISTWATCH". Semantic data 644 is associated with application identification data 640 "TIME" and action identification data 642 "DISPLAY_CURRENT_TIME" while semantic data 646 is associated with application identification data 648 "CALENDAR" and an action 650 having a null value. When the AR device detects a gesture associated with semantic data 644 "WRISTWATCH", the AR device, as described below, either: invokes a "TIME" application and the "TIME" application executes the "DISPLAY_CURRENT_TIME" action; or invokes the "CALENDAR" application and the "CALENDAR" application is provided to the user of the AR device.

In some examples, an application is registered along with an action of the application. This serves as an instruction to an AR device, upon detecting a gesture, to invoke the registered application and instruct the application to execute the identified action of the application. For example, the registration tag 658a includes application identification data 640 identifying an application "TIME" and action identification data 642 identifying an action "DISPLAY_CURRENT_TIME". Registration tag 658a further includes semantic data 644 associating a gesture having a meaning of "WRISTWATCH" with the application "TIME" and the action "DISPLAY_CURRENT_TIME". When the AR device detects a gesture having the meaning of "WRISTWATCH", the AR device invokes the application "TIME" and instructs the invoked application "TIME" to execute the action "DISPLAY_CURRENT_TIME".

In some examples, an application is registered without an identified action. This serves as an instruction to an AR device, upon detecting a gesture, to invoke the registered application without instructing the application to execute a particular action. For example, the registration tag 658b includes application identification data 648 identifying an application "CALENDAR" and action identification data 650 that is "NULL" or empty. Registration tag 658b further includes semantic data 646 associating a gesture having a meaning of "WRISTWATCH" with the application "CALENDAR". When the AR device detects a gesture having a meaning of "WRISTWATCH", the AR device invokes the application "CALENDAR" and does not instruct the application "CALENDAR" to execute any particular action.

In some examples, an action is registered without an application. This serves as an instruction to an AR device, upon detecting a gesture, to invoke or execute the action directly, such as by making a system level call to a system function. For example, registration tag 658c includes action identification data 654 identifying an action "SYSTEM_POWER_DOWN" while application identification data 652 is "NULL" or empty. The registration tag 658c further includes semantic data 656 associating a gesture having a meaning of "POWER_DOWN" with the action "SYSTEM_POWER_DOWN." When the AR device detects a gesture having a meaning of "POWER_DOWN", the AR device executes a function to power down without invoking another application.

Figure 6C:
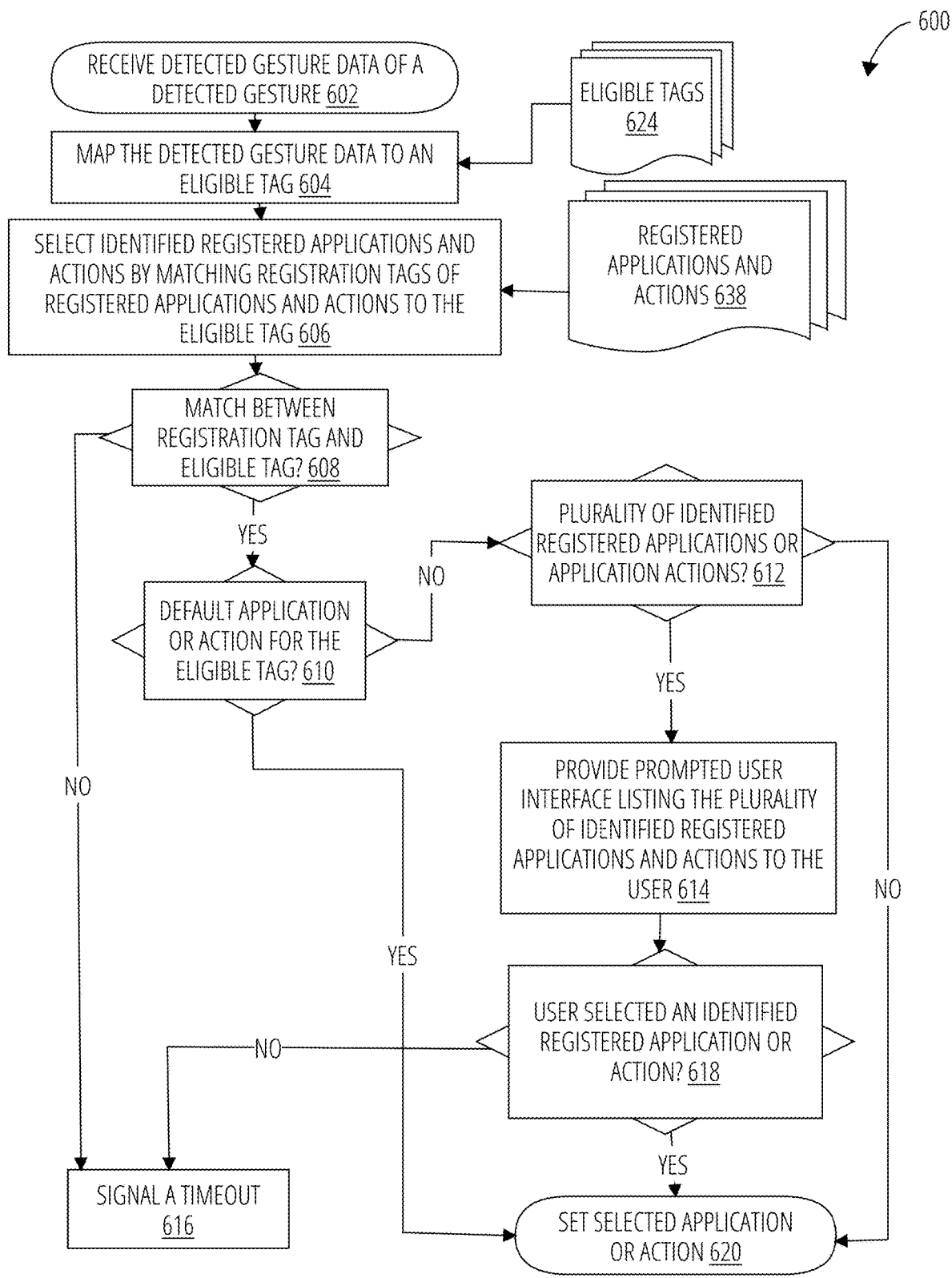
FIG. 6C is process flow diagram of an application management process of an AR device in accordance with some examples.

FIG. 6C is a process flow diagram of an application or action selection process 600 used by an AR device in accordance with some examples. The application or action selection process 600 maps detected gesture data of a detected gesture, such as detected gesture data 524 of FIG. 5, to one or more applications or actions. If the detected gesture data maps to more than one application or action, the application or action selection process 600 provides a user interface to a user so that the user selects an application or action.

In operation 602, the AR device receives detected gesture data of a detected gesture. In operation 604, the AR device maps the detected gesture data 524 to an eligible tag from a set of eligible tags 624. In an example, the AR device matches gesture identification data included in the detected gesture data to gesture identification data included in the eligible tag.

In operation 606, the AR device selects a set of identified registered applications and actions on a basis of a registered application or action of the set of registered applications and actions 638 having a registration tag that matches the eligible tag. In an example, a registration tag includes application identification data and action identification data that is associated with semantic data of a gesture. The eligible tag includes semantic data of the detected gesture. The AR device determines that the eligible tag matches the registration tag when the semantic data of the eligible tag matches the semantic data of the registration tag.

In operation 608 the AR device determines if there has been a match between the eligible tag and one or more registration tags, and thus one or more applications or actions, during operation 606. If there have been no matches made, then the AR device signals a timeout in operation 616.

If a match was made in operation 608, the AR device determines if there is a default application or action for the eligible tag in operation 610. A default application or action is a preset application or action that is specified in a configuration process to be a default application or action for a detected gesture. In some examples, the configuration process may be part of an application installation process when an application is installed on the AR device. In additional examples, the default application or action may be specified in a configuration file located on the AR device by a user using a configuration function of an application installed on the AR device or be specified in a global configuration file where defaults may be specified for a plurality of gestures. If the AR device determines there is a default application or action specified for the detected gesture, the AR device sets the default application or action as a selected application or selected action in operation 620.

If there is not a default application or action as determined in operation 610, the AR device determines if there is a plurality of identified registered applications or application actions in the set of identified registered applications and actions. If there is one identified registered application or action in the set of identified registered applications and actions, the AR device sets the one identified registered application or action in the set of identified registered applications and actions as a selected application or selected action in operation 620.

If in operation 612 the AR device determines that there is a plurality of identified registered applications or application actions in the set of identified registered applications and actions having a tag matching the eligible tag, the AR device provides a prompted user interface to the user of the AR device in operation 614. The prompted user interface allows the user to make a selection of an identified registered application or action as a selected action from a listing of the plurality of identified registered applications or application actions as more fully described in FIG. 7A and FIG. 7B.

In operation 618, the AR device determines if the user selected an identified registered application or action from the plurality of identified registered applications or application actions. If the AR device determines that the user has selected an identified registered application or action, the AR device sets the identified registered application or action as a selected application or selected action in operation 620. If the AR device determines that the user has not selected an identified registered application or action, the AR device signals a timeout in operation 616.

In some examples, gesture data generated for a detected gesture includes a gesture identification number.

In some examples, the gesture data includes a textual gesture identification such as "hands_forming_heart" or "two_index_fingers_touching."

In some examples, an application may register for a gesture or multiple pre-defined gestures. An application may register actions implicitly by defining the actions they expose via a settings file bundled into the file.

In some examples, a dynamic registration model is utilized to enable multiple applications or actions to be executed in parallel. In such examples, an action manager scans available applications and keeps track of application actions associated with the applications. As such, the action manager may act as a global registry for application options, abstracts away the applications from the global scanning modes and controls registration of the applications.

In some examples, an application manager may decide which applications are allowed to register actions (and for which gestures and/or tags) and may also act as a secure forward "proxy" to prevent sensitive data from being passed to 3rd party applications.

In some such examples, the action manager may offer a dedicated user interface or extend an existing settings application for a user to add or disable applications from being invoked during scanning.

Figure 7A:
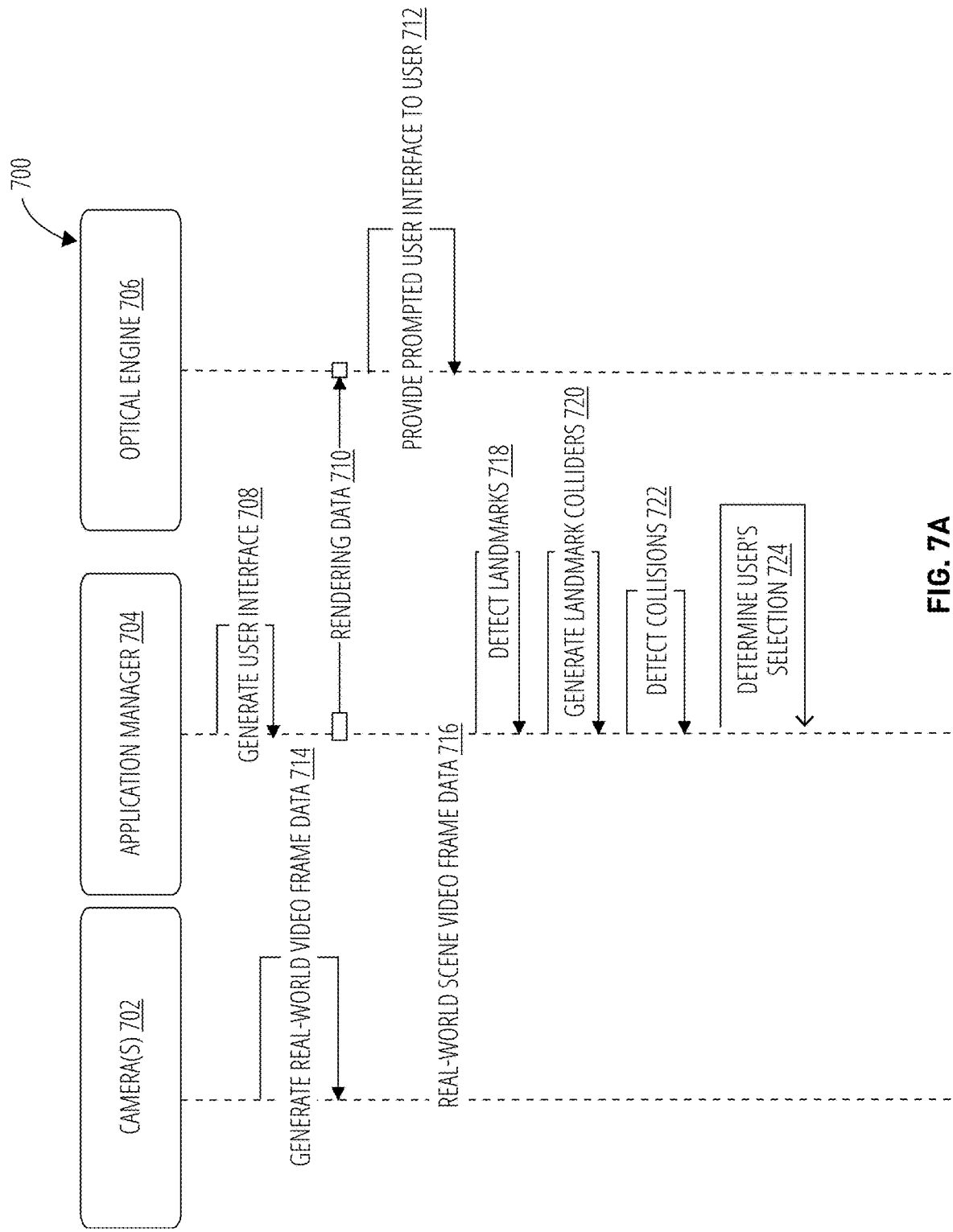
FIG. 7A is a sequence diagram of a prompted user interface process of an AR device in accordance with some examples.
Figure 7B:
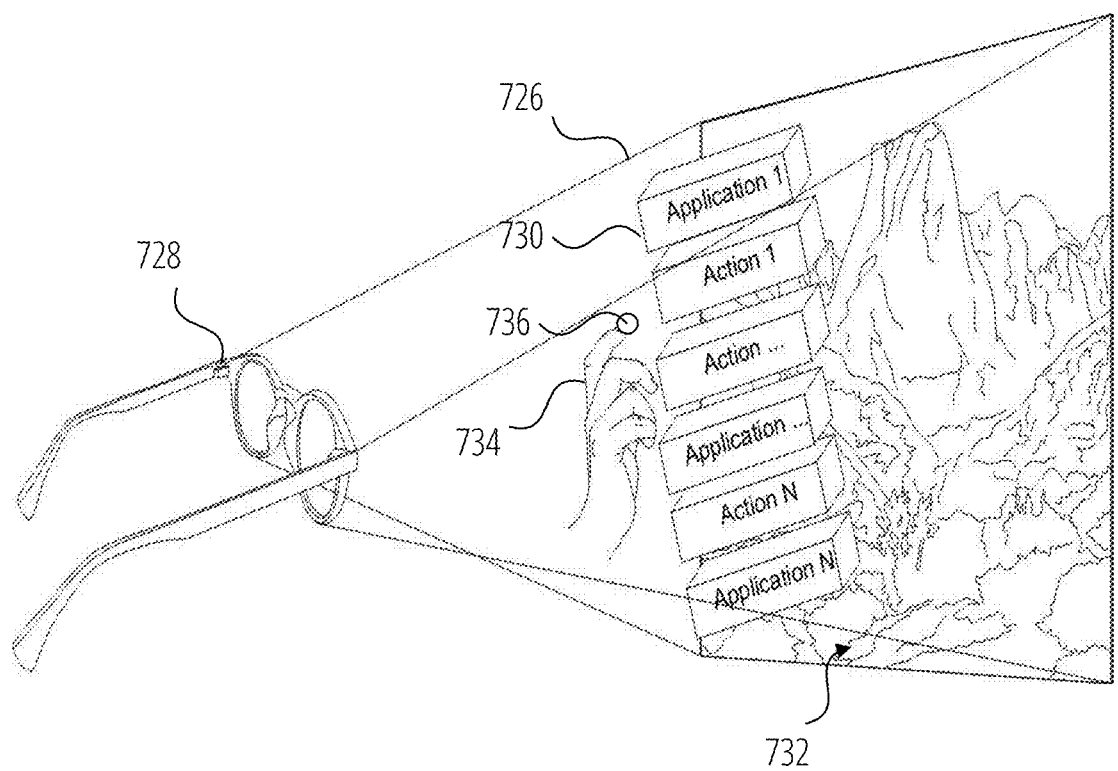
FIG. 7B is a prompted user interface of an AR device in accordance with some examples.

Referring now to FIG. 7A and FIG. 7B, FIG. 7A depicts a sequence diagram of a prompted user interface process 700 of an application and application action selection process such as application or action selection process 600 of FIG. 6C, and FIG. 7B depicts a prompted user interface 726 in accordance with some examples. The prompted user interface process 700 and the prompted user interface 726 are utilized by an AR device 728, such as glasses 100 of FIG. 1, to determine a selection of an application or action by a user when more than one of the registered applications and actions match an eligible tag and there is no default application or action defined. The AR device 728 utilizes hand tracking methodologies to detect a user's direct manipulation of virtual objects included in the prompted user interface 726. In some examples, the AR device 728 utilizes detected gestures as user inputs into the prompted user interface.

In operation 708, the application manager 704 of AR device 728 generates the prompted user interface 726 including a plurality of virtual objects 730 that constitute interactive elements having textual information identifying a plurality of identified registered applications and actions from a set of registered applications and actions where the plurality of identified registered applications and actions have respective registration tags that match an eligible tag of a detected gesture.

The application manager 704 generates a rendering of the prompted user interface 726 and communicates rendering data 710 to an optical engine 706 of the AR device 728. In operation 712, the optical engine 706 provides the prompted user interface 726 in a display based on the rendering data to a user of the AR device 728.

In operation 714, one or more cameras 702 of the AR device 728 generate real-world scene video frame data 716 of the real-world scene 732 as viewed by the user of the AR device 728. The real-world scene video frame data 716 includes hand movement video frame data indicating how the user is moving one or more of their hands, hand position video frame data indicating what positions the user is holding their hands in while making movements, and hand location video frame data indicating where one or more of the user's hands 734 are located in the real-world scene (collectively hand movement, position, and location video frame data) from a perspective of the user while wearing the AR device 728 and viewing the projection of the rendering of the prompted user interface 726 provided by the optical engine 706. The one or more cameras 702 communicate the real-world scene video frame data 716 to the application manager 704.

To provide a way for a user to interact with the one or more virtual objects 730 of the prompted user interface 726, one or more user moveable colliders are provided based on a moveable object in the real-world scene, such as one or more of the user's hands. In operation 718 the application manager 704 utilizes feature extraction methodologies to extract features of the user's hands from the hand movement, position, and location video frame data included in the real-world scene video frame data 716. The application manager 704 utilizes object detection methodologies and the features of the user's hands extracted from the hand movement, position, and location video frame data to detect landmarks associated with the user's hands 734 as the user moves their hands in the real-world scene. In operation 720, the application manager 704 generates one or more landmark colliders 736 in the prompted user interface 726 corresponding to one or more detected landmarks on the user's hands 734. The user may move one or more portions of their hands to move the one or more landmark colliders 736 within the prompted user interface 726.

In operation 722, the application manager 704 detects collisions between the one or more landmark colliders 736 and one or more of the virtual objects 730. In operation 724 the application manager 704 uses the collisions to determine user interactions by the user with the virtual objects 730 and determines a user's selection of one identified registered application or action of the plurality of identified registered applications and actions as a selected application or selected action.

In some examples, an AR device uses hand tracking methodologies and a user interface provided to a user, such as the prompted user interface 726. The user interface includes interactive elements in the form of virtual objects, such as virtual objects 730, that the user can interact with. In contrast to an unprompted gesture-based user interface that scans for and detects unprompted contactless gestures as user inputs as described in, for example, FIGS. 5 and 6, a hand tracking-based user interface utilizes interactive components in the form of virtual objects to prompt and guide a user into making a prompted user input. Though prompted, the prompted user input is still based on contactless methodologies as described herein.

In some examples, gesture detection methodologies are used to detect user inputs instead of hand tracking methodologies. For example, a list of options of identified registered applications or registered applications and actions are provided to the user in a vertical format and the user uses a "thumbs up" gesture to move a selector virtual object up the list, a "thumbs down" gesture to move the virtual selection down the list, and a "OK" gesture to indicate that the selector is on an application or action that the user wants to select.

Figure 9:
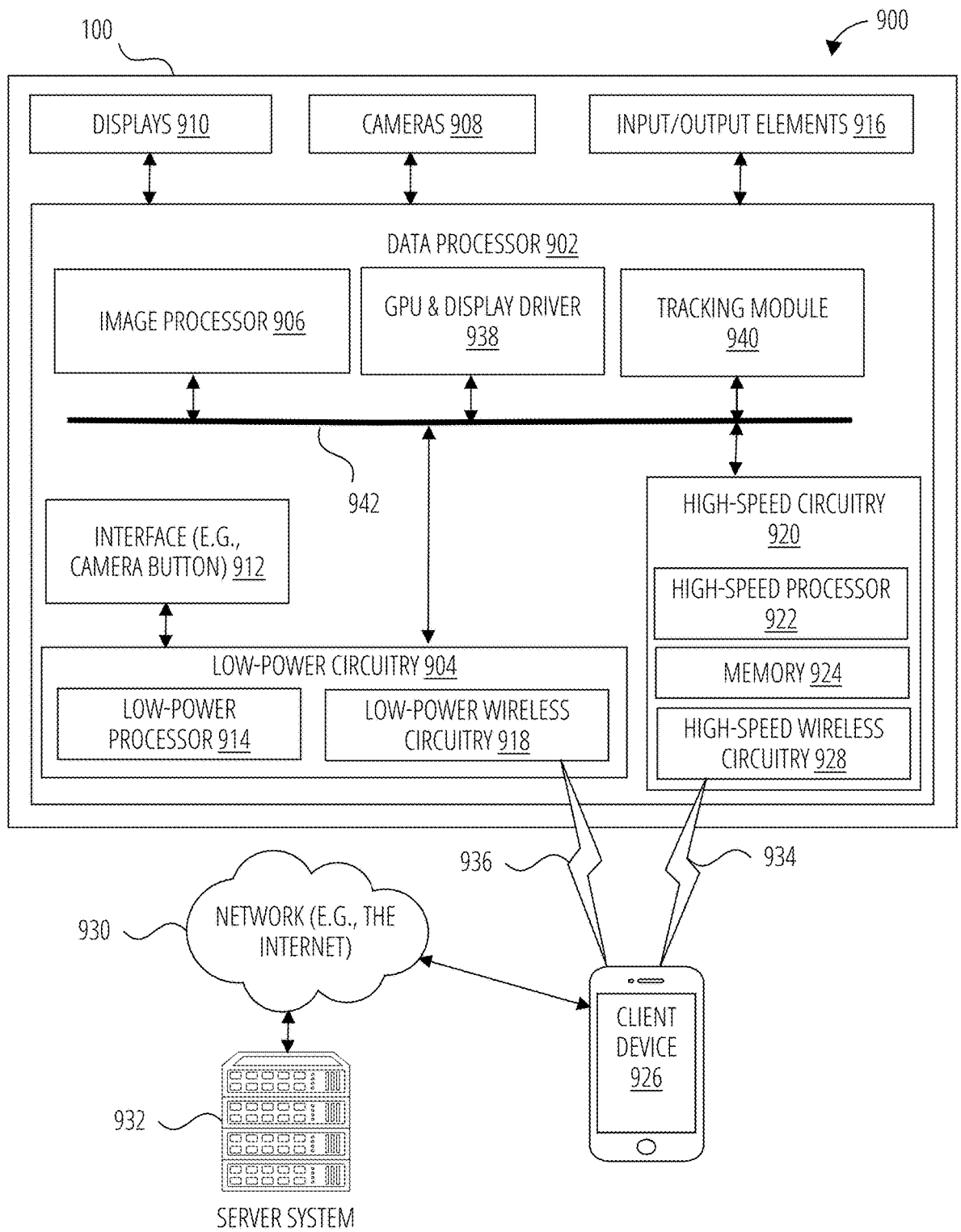
FIG. 9 is a block diagram illustrating a networked system 900 including details of the head-worn device of FIG. 1, in accordance with some examples.

FIG. 9 is a block diagram illustrating a networked system 900 including details of the glasses 100, in accordance with some examples. The networked system 900 includes the glasses 100, a client device 926, and a server system 932. The client device 926 may be a smartphone, tablet, phablet, laptop computer, access point, or any other such device capable of connecting with the glasses 100 using a low-power wireless connection 936 and/or a high-speed wireless connection 934. The client device 926 is connected to the server system 932 via the network 930. The network 930 may include any combination of wired and wireless connections. The server system 932 may be one or more computing devices as part of a service or network computing system. The client device 926 and any elements of the server system 932 and network 930 may be implemented using details of the software architecture 1104 or the machine 300 described in FIG. 11 and FIG. 3 respectively.

The glasses 100 include a data processor 902, displays 910, one or more cameras 908, and additional input/output elements 916. The input/output elements 916 may include microphones, audio speakers, biometric sensors, additional sensors, or additional display elements integrated with the data processor 902. Examples of the input/output elements 916 are discussed further with respect to FIG. 11 and FIG. 3. For example, the input/output elements 916 may include any of I/O components 306 including output components 328, motion components 336, and so forth. Examples of the displays 910 are described in FIG. 2. In the particular examples described herein, the displays 910 include a display for the user's left and right eyes.

The data processor 902 includes an image processor 906 (e.g., a video processor), a GPU & display driver 938, a tracking module 940, an interface 912, low-power circuitry 904, and high-speed circuitry 920. The components of the data processor 902 are interconnected by a bus 942.

The interface 912 refers to any source of a user command that is provided to the data processor 902. In one or more examples, the interface 912 is a physical button that, when depressed, sends a user input signal from the interface 912 to a low-power processor 914. A depression of such button followed by an immediate release may be processed by the low-power processor 914 as a request to capture a single image, or vice versa. A depression of such a button for a first period of time may be processed by the low-power processor 914 as a request to capture video data while the button is depressed, and to cease video capture when the button is released, with the video captured while the button was depressed stored as a single video file. Alternatively, depression of a button for an extended period of time may capture a still image. In some examples, the interface 912 may be any mechanical switch or physical interface capable of accepting user inputs associated with a request for data from the cameras 908. In other examples, the interface 912 may have a software component, or may be associated with a command received wirelessly from another source, such as from the client device 926.

The image processor 906 includes circuitry to receive signals from the cameras 908 and process those signals from the cameras 908 into a format suitable for storage in the memory 924 or for transmission to the client device 926. In one or more examples, the image processor 906 (e.g., video processor) comprises a microprocessor integrated circuit (IC) customized for processing sensor data from the cameras 908, along with volatile memory used by the microprocessor in operation.

The low-power circuitry 904 includes the low-power processor 914 and the low-power wireless circuitry 918. These elements of the low-power circuitry 904 may be implemented as separate elements or may be implemented on a single IC as part of a system on a single chip. The low-power processor 914 includes logic for managing the other elements of the glasses 100. As described above, for example, the low-power processor 914 may accept user input signals from the interface 912. The low-power processor 914 may also be configured to receive input signals or instruction communications from the client device 926 via the low-power wireless connection 936. The low-power wireless circuitry 918 includes circuit elements for implementing a low-power wireless communication system. Bluetooth™ Smart, also known as Bluetooth™ low energy, is one standard implementation of a low power wireless communication system that may be used to implement the low-power wireless circuitry 918. In other examples, other low power communication systems may be used.

The high-speed circuitry 920 includes a high-speed processor 922, a memory 924, and a high-speed wireless circuitry 928. The high-speed processor 922 may be any processor capable of managing high-speed communications and operation of any general computing system used for the data processor 902. The high-speed processor 922 includes processing resources used for managing high-speed data transfers on the high-speed wireless connection 934 using the high-speed wireless circuitry 928. In some examples, the high-speed processor 922 executes an operating system such as a LINUX operating system or other such operating system such as the operating system 1112 of FIG. 11. In addition to any other responsibilities, the high-speed processor 922 executing a software architecture for the data processor 902 is used to manage data transfers with the high-speed wireless circuitry 928. In some examples, the high-speed wireless circuitry 928 is configured to implement Institute of Electrical and Electronic Engineers (IEEE) 802.11 communication standards, also referred to herein as Wi-Fi®. In other examples, other high-speed communications standards may be implemented by the high-speed wireless circuitry 928.

The memory 924 includes any storage device capable of storing camera data generated by the cameras 908 and the image processor 906. While the memory 924 is shown as integrated with the high-speed circuitry 920, in other examples, the memory 924 may be an independent stand-alone element of the data processor 902. In some such examples, electrical routing lines may provide a connection through a chip that includes the high-speed processor 922 from image processor 906 or the low-power processor 914 to the memory 924. In other examples, the high-speed processor 922 may manage addressing of the memory 924 such that the low-power processor 914 will boot the high-speed processor 922 any time that a read or write operation involving the memory 924 is desired.

The tracking module 940 estimates a pose of the glasses 100. For example, the tracking module 940 uses image data and associated inertial data from the cameras 908 and the position components 340, as well as GPS data, to track a location and determine a pose of the glasses 100 relative to a frame of reference (e.g., real-world scene environment). The tracking module 940 continually gathers and uses updated sensor data describing movements of the glasses 100 to determine updated three-dimensional poses of the glasses 100 that indicate changes in the relative position and orientation relative to physical objects in the real-world scene environment. The tracking module 940 permits visual placement of virtual objects relative to physical objects by the glasses 100 within the field of view of the user via the displays 910.

The GPU & display driver 938 may use the pose of the glasses 100 to generate frames of virtual content or other content to be presented on the displays 910 when the glasses 100 are functioning in a traditional augmented reality mode. In this mode, the GPU & display driver 938 generates updated frames of virtual content based on updated three-dimensional poses of the glasses 100, which reflect changes in the position and orientation of the user in relation to physical objects in the user's real-world scene environment.

One or more functions or operations described herein may also be performed in an application resident on the glasses 100 or on the client device 926, or on a remote server. For example, one or more functions or operations described herein may be performed by one of the applications 1106 such as messaging Application 1146.

Figure 10:
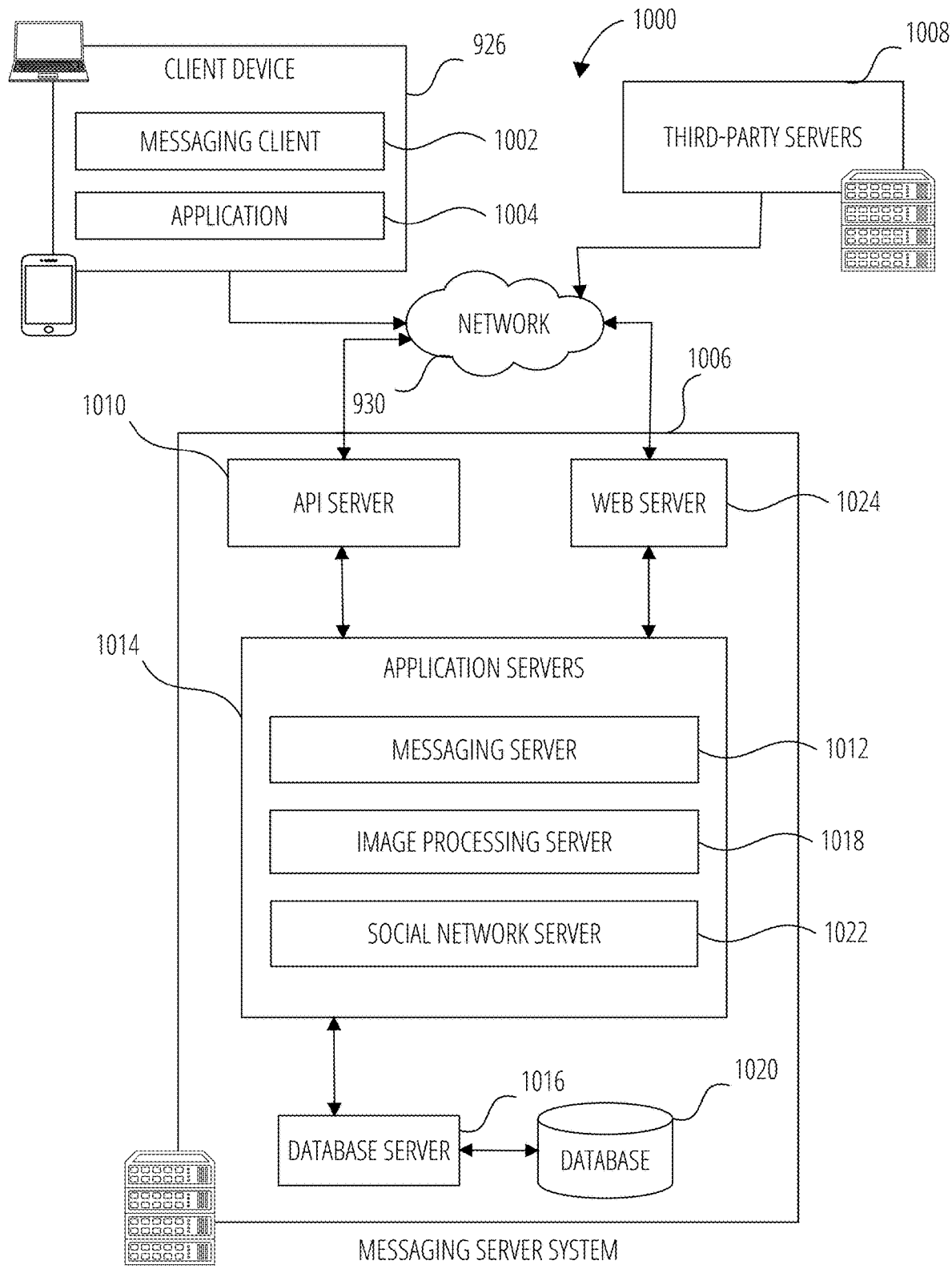
FIG. 10 is a diagrammatic representation of a networked environment in which the present disclosure may be deployed, in accordance with some examples.

FIG. 10 is a block diagram showing an example messaging system 1000 for exchanging data (e.g., messages and associated content) over a network. The messaging system 1000 includes multiple instances of a client device 926 which host a number of applications, including a messaging client 1002 and other Applications 1004. A messaging client 1002 is communicatively coupled to other instances of the messaging client 1002 (e.g., hosted on respective other client devices 926), a messaging server system 1006 and third-party servers 1008 via a network 930 (e.g., the Internet). A messaging client 1002 can also communicate with locally-hosted Applications 1004 using Application Program Interfaces (APIs).

A messaging client 1002 is able to communicate and exchange data with other messaging clients 1002 and with the messaging server system 1006 via the network 930. The data exchanged between messaging clients 1002, and between a messaging client 1002 and the messaging server system 1006, includes functions (e.g., commands to invoke functions) as well as payload data (e.g., text, audio, video or other multimedia data).

The messaging server system 1006 provides server-side functionality via the network 930 to a particular messaging client 1002. While some functions of the messaging system 1000 are described herein as being performed by either a messaging client 1002 or by the messaging server system 1006, the location of some functionality either within the messaging client 1002 or the messaging server system 1006 may be a design choice. For example, it may be technically preferable to initially deploy some technology and functionality within the messaging server system 1006 but to later migrate this technology and functionality to the messaging client 1002 where a client device 926 has sufficient processing capacity.

The messaging server system 1006 supports various services and operations that are provided to the messaging client 1002. Such operations include transmitting data to, receiving data from, and processing data generated by the messaging client 1002. This data may include message content, client device information, geolocation information, media augmentation and overlays, message content persistence conditions, social network information, and live event information, as examples. Data exchanges within the messaging system 1000 are invoked and controlled through functions available via user interfaces (UIs) of the messaging client 1002.

Turning now specifically to the messaging server system 1006, an Application Program Interface (API) server 1010 is coupled to, and provides a programmatic interface to, application servers 1014. The application servers 1014 are communicatively coupled to a database server 1016, which facilitates access to a database 1020 that stores data associated with messages processed by the application servers 1014. Similarly, a web server 1024 is coupled to the application servers 1014, and provides web-based interfaces to the application servers 1014. To this end, the web server 1024 processes incoming network requests over the Hypertext Transfer Protocol (HTTP) and several other related protocols.

The Application Program Interface (API) server 1010 receives and transmits message data (e.g., commands and message payloads) between the client device 926 and the application servers 1014. Specifically, the Application Program Interface (API) server 1010 provides a set of interfaces (e.g., routines and protocols) that can be called or queried by the messaging client 1002 in order to invoke functionality of the application servers 1014. The Application Program Interface (API) server 1010 exposes various functions supported by the application servers 1014, including account registration, login functionality, the sending of messages, via the application servers 1014, from a particular messaging client 1002 to another messaging client 1002, the sending of media files (e.g., images or video) from a messaging client 1002 to a messaging server 1012, and for possible access by another messaging client 1002, the settings of a collection of media data (e.g., story), the retrieval of a list of friends of a user of a client device 926, the retrieval of such collections, the retrieval of messages and content, the addition and deletion of entities (e.g., friends) to an entity graph (e.g., a social graph), the location of friends within a social graph, and opening an application event (e.g., relating to the messaging client 1002).

The application servers 1014 host a number of server applications and subsystems, including for example a messaging server 1012, an image processing server 1018, and a social network server 1022. The messaging server 1012 implements a number of message processing technologies and functions, particularly related to the aggregation and other processing of content (e.g., textual and multimedia content) included in messages received from multiple instances of the messaging client 1002. As will be described in further detail, the text and media content from multiple sources may be aggregated into collections of content (e.g., called stories or galleries). These collections are then made available to the messaging client 1002. Other processor and memory intensive processing of data may also be performed server-side by the messaging server 1012, in view of the hardware requirements for such processing.

The application servers 1014 also include an image processing server 1018 that is dedicated to performing various image processing operations, typically with respect to images or video within the payload of a message sent from or received at the messaging server 1012.

The social network server 1022 supports various social networking functions and services and makes these functions and services available to the messaging server 1012. To this end, the social network server 1022 maintains and accesses an entity graph within the database 1020. Examples of functions and services supported by the social network server 1022 include the identification of other users of the messaging system 1000 with which a particular user has relationships or is "following," and also the identification of other entities and interests of a particular user.

The messaging client 1002 can notify a user of the client device 926, or other users related to such a user (e.g., "friends"), of activity taking place in shared or shareable sessions. For example, the messaging client 1002 can provide participants in a conversation (e.g., a chat session) in the messaging client 1002 with notifications relating to the current or recent use of a game by one or more members of a group of users. One or more users can be invited to join in an active session or to launch a new session. In some examples, shared sessions can provide a shared augmented reality experience in which multiple people can collaborate or participate.

Figure 11:
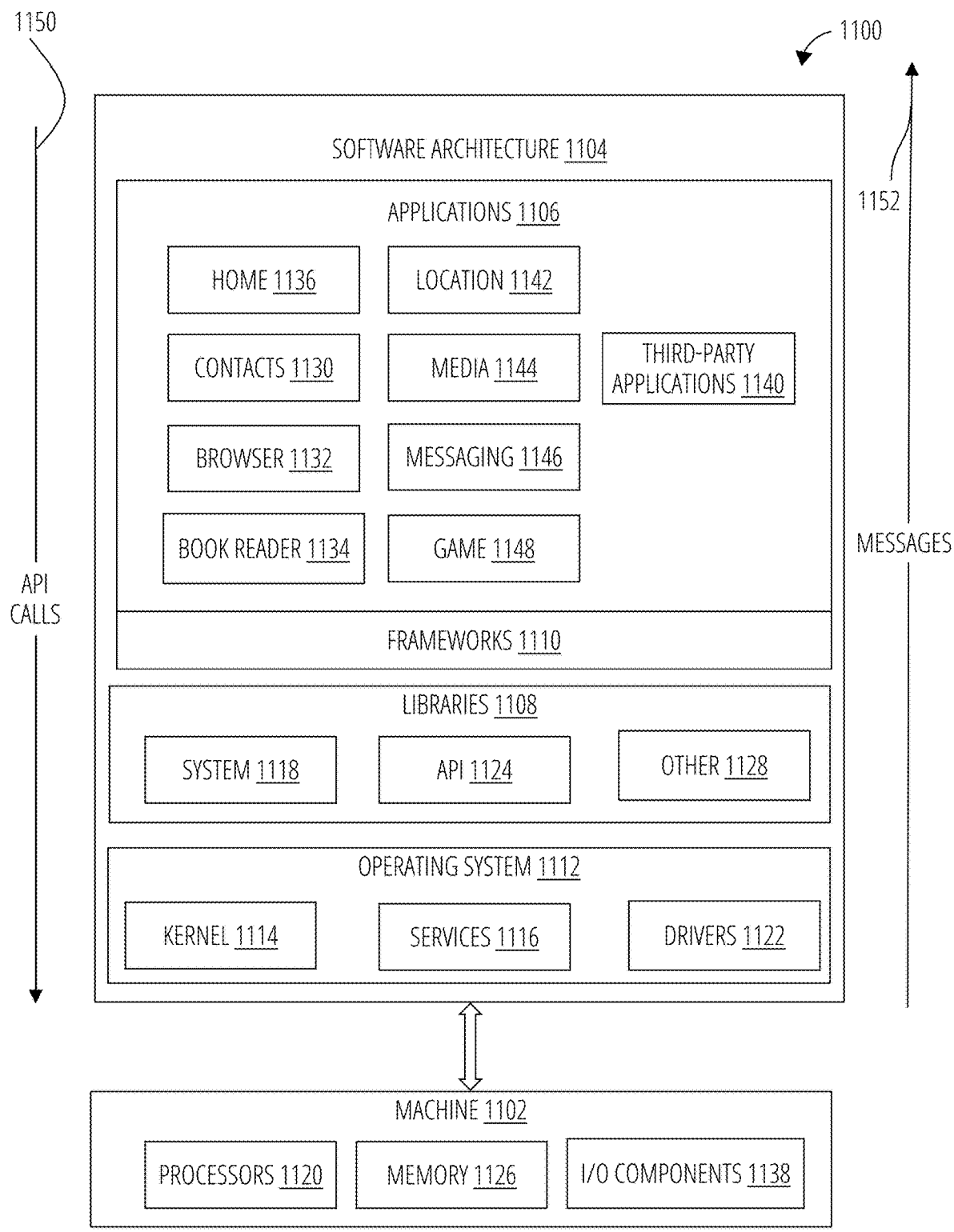
FIG. 11 is a block diagram showing a software architecture within which the present disclosure may be implemented, in accordance with some examples.

FIG. 11 is a block diagram 1100 illustrating a software architecture 1104, which can be installed on any one or more of the devices described herein. The software architecture 1104 is supported by hardware such as a machine 1102 that includes processors 1120, memory 1126, and I/O components 1138. In this example, the software architecture 1104 can be conceptualized as a stack of layers, where individual layers provides a particular functionality. The software architecture 1104 includes layers such as an operating system 1112, libraries 1108, frameworks 1110, and applications 1106. Operationally, the applications 1106 invoke API calls 1150 through the software stack and receive messages 1152 in response to the API calls 1150.

The operating system 1112 manages hardware resources and provides common services. The operating system 1112 includes, for example, a kernel 1114, services 1116, and drivers 1122. The kernel 1114 acts as an abstraction layer between the hardware and the other software layers. For example, the kernel 1114 provides memory management, processor management (e.g., scheduling), component management, networking, and security settings, among other functionalities. The services 1116 can provide other common services for the other software layers. The drivers 1122 are responsible for controlling or interfacing with the underlying hardware. For instance, the drivers 1122 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 1108 provide a low-level common infrastructure used by the applications 1106. The libraries 1108 can include system libraries 1118 (e.g., C standard library) that provide functions such as memory allocation functions, string manipulation functions, mathematic functions, and the like. In addition, the libraries 1108 can include API libraries 1124 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) graphic content on a display, GLMotif used to implement user interfaces), image feature extraction libraries (e.g. OpenIMAJ), database libraries (e.g., SQLite to provide various relational database functions), web libraries (e.g., WebKit to provide web browsing functionality), and the like. The libraries 1108 can also include a wide variety of other libraries 1128 to provide many other APIs to the applications 1106.

The frameworks 1110 provide a high-level common infrastructure that is used by the applications 1106. For example, the frameworks 1110 provide various graphical user interface (GUI) functions, high-level resource management, and high-level location services. The frameworks 1110 can provide a broad spectrum of other APIs that can be used by the applications 1106, some of which may be specific to a particular operating system or platform.

In an example, the applications 1106 may include a home Application 1136, a contacts Application 1130, a browser Application 1132, a book reader Application 1134, a location Application 1142, a media Application 1144, a messaging Application 1146, a game Application 1148, and a broad assortment of other applications such as third-party applications 1140. The applications 1106 are programs that execute functions defined in the programs. Various programming languages can be employed to create one or more of the applications 1106, structured in a variety of manners, such as object-oriented programming languages (e.g., Objective-C, Java, or C++) or procedural programming languages (e.g., C or assembly language). In a specific example, the third-party applications 1140 (e.g., applications developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party applications 1140 can invoke the API calls 1150 provided by the operating system 1112 to facilitate functionality described herein.

A "carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

A "client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

A "communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

A "component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing some operations and may be configured or arranged in a particular physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform some operations as described herein. A hardware component may also be implemented mechanically, electronically, or any suitable combination thereof. For example, a hardware component may include dedicated circuitry or logic that is permanently configured to perform some operations. A hardware component may be a special-purpose processor, such as a field-programmable gate array (FPGA) or an application specific integrated circuit (ASIC). A hardware component may also include programmable logic or circuitry that is temporarily configured by software to perform some operations. For example, a hardware component may include software executed by a general-purpose processor or other programmable processor. Once configured by such software, hardware components become specific machines (or specific components of a machine) tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") is to be understood to encompass a tangible entity, be that an entity that is physically constructed, permanently configured (e.g., hardwired), or temporarily configured (e.g., programmed) to operate in a particular manner or to perform some operations described herein. Considering examples in which hardware components are temporarily configured (e.g., programmed), the hardware components may not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled.

Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be partially processor-implemented, with a particular processor or processors being an example of hardware. For example, some of the operations of a method may be performed by one or more processors or processor-implemented components. Moreover, the one or more processors may also operate to support performance of the relevant operations in a "cloud computing" environment or as a "software as a service" (SaaS). For example, at some of the operations may be performed by a group of computers (as examples of machines including processors), with these operations being accessible via a network (e.g., the Internet) and via one or more appropriate interfaces (e.g., an API). The performance of some of the operations may be distributed among the processors, residing within a single machine as well as being deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

A "computer-readable medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

A "machine-storage medium" refers to a single or multiple storage devices and/or media (e.g., a centralized or distributed database, and/or associated caches and servers) that store executable instructions, routines and/or data. The term includes, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at some of which are covered under the term "signal medium."

A "processor" refers to any circuit or virtual circuit (a physical circuit emulated by logic executing on an actual processor) that manipulates data values according to control signals (e.g., "commands", "op codes", "machine code", and so forth) and which produces associated output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

A "signal medium" refers to any intangible medium that is capable of storing, encoding, or carrying the instructions for execution by a machine and includes digital or analog communications signals or other intangible media to facilitate communication of software or data. The term "signal medium" may be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

Changes and modifications may be made to the disclosed examples without departing from the scope of the present disclosure. These and other changes or modifications are intended to be included within the scope of the present disclosure, as expressed in the following claims.

What is claimed is:

1. A computer-implemented method comprising:
storing, by one or more processors of an Augmented Reality (AR) device, a plurality of registration tags, each registration tag associating a gesture to a registered application and a first action;
detecting, by the one or more processors, using one or more cameras of the AR device, an unprompted gesture made by a user of the AR device;
mapping, by the one or more processors, the unprompted gesture to a plurality of registered applications using the unprompted gesture and the plurality of registration tags by matching the unprompted gesture to the gesture of two or more of the plurality of registration tags; and
in response to the matching of the unprompted gesture to the gesture of two or more of the plurality of registration tags, performing operations comprising:
providing a user interface having a display of the plurality of registered applications selectable by the user;
determining a user selection of a selected application from among the plurality of registered applications using the user interface;

determining a second action using the selected application and a respective registration tag of the plurality of registration tags; and invoking, by the one or more processors, the selected application, to cause the selected application to be loaded into a working memory and executed by the one or more processors to perform the second action.

2. The computer-implemented method of claim 1, wherein determining the user selection of the selected application further comprises:

determining that the selected application is a preset default application associated with the detected gesture.

3. The computer-implemented method of claim 1, wherein the unprompted gesture is a contactless gesture.

4. The computer-implemented method of claim 1, wherein the AR device is glasses.

5. The computer-implemented method of claim 1, wherein invoking the selected application further comprises passing input parameters to the selected application.

6. A computing apparatus comprising:
one or more processors; and
a memory storing instructions that, when executed by the one or more processors, configure the computing apparatus to perform operations comprising:

storing, by one or more processors of an Augmented Reality (AR) device, a plurality of registration tags, each registration tag associating a gesture to a registered application and a first action;

detecting, by the one or more processors, using one or more cameras of the AR device, an unprompted gesture made by a user of the AR device;

mapping, by the one or more processors, the unprompted gesture to a plurality of registered applications using the unprompted gesture and the plurality of registration tags by matching the unprompted gesture to the gesture of two or more of the plurality of registration tags; and in response to the matching of the unprompted gesture to the gesture of two or more of the plurality of registration tags, performing operations comprising:

providing a user interface having a display of the plurality of registered applications selectable by the user;

determining a user selection of a selected application from among the plurality of registered applications using the user interface;

determining a second action using the selected application and a respective registration tag of the plurality of registration tags; and invoking, by the one or more processors, the selected application, to cause the selected application to be loaded into a working memory and executed by the one or more processors to perform the second action.

7. The computing apparatus of claim 6, wherein determining the user selection of the selected application further comprises:

determining that the selected application is a preset default application associated with the detected gesture.

8. The computing apparatus of claim 6, wherein the unprompted gesture is a contactless gesture.

9. The computing apparatus of claim 6, wherein the AR device is glasses.

10. The computing apparatus of claim 6, wherein invoking the selected application further comprises passing input parameters to the selected application.

11. A non-transitory computer-readable storage medium, the computer-readable storage medium including instructions that when executed by a computer, cause the computer to perform operations comprising:

storing, by one or more processors of an Augmented Reality (AR) device, a plurality of registration tags, each registration tag associating a gesture to a registered application and a first action;

detecting, by the one or more processors, using one or more cameras of the AR device, an unprompted gesture made by a user of the AR device;

mapping, by the one or more processors, the unprompted gesture to a plurality of registered applications using the unprompted gesture and the plurality of registration tags by matching the unprompted gesture to the gesture of two or more of the plurality of registration tags; and in response to the matching of the unprompted gesture to the gesture of two or more of the plurality of registration tags, performing operations comprising:

providing a user interface having a display of the plurality of registered applications selectable by the user;

determining a user selection of a selected application from among the plurality of registered applications using the user interface;

determining a second action using the selected application and the plurality of registration tags; and invoking, by the one or more processors, the selected application, to cause the selected application to be loaded into a working memory and executed by the one or more processors to perform the second action.

12. The non-transitory computer-readable storage medium of claim 11, wherein determining the user selection of the selected application further comprises:

determining that the selected application is a preset default application associated with the detected gesture.

13. The non-transitory computer-readable storage medium of claim 11, wherein the unprompted gesture is a contactless gesture.

14. The non-transitory computer-readable storage medium of claim 11, wherein the AR device is glasses.

15. The non-transitory computer-readable storage medium of claim 11, wherein invoking the selected application further comprises passing input parameters to the selected application.

* * * * *